United States Patent
Huang

(10) Patent No.: US 11,431,770 B2
(45) Date of Patent: Aug. 30, 2022

(54) METHOD, SYSTEM, APPARATUS, AND ELECTRONIC DEVICE FOR MANAGING DATA STREAMS IN A MULTI-USER INSTANT MESSAGING SYSTEM

(71) Applicant: Tencent Technology (Shenzhen) Company Limited, Shenzhen (CN)

(72) Inventor: Liuwen Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/159,088

(22) Filed: Jan. 26, 2021

(65) Prior Publication Data
US 2021/0227005 A1  Jul. 22, 2021

Related U.S. Application Data

(63) Continuation of application No. PCT/CN2020/096818, filed on Jun. 18, 2020.

(30) Foreign Application Priority Data
Jan. 16, 2020 (CN) .......................... 202010048012.7

(51) Int. Cl.
*H04L 65/403* (2022.01)
*H04L 51/10* (2022.01)
(Continued)

(52) U.S. Cl.
CPC ............ *H04L 65/403* (2013.01); *H04L 51/04* (2013.01); *H04L 51/10* (2013.01); *H04L 65/75* (2022.05)

(58) Field of Classification Search
CPC ........ H04L 65/403; H04L 51/04; H04L 51/10; H04L 65/601
(Continued)

(56) References Cited

U.S. PATENT DOCUMENTS 9,137,302 B1 * 9/2015 Makhijani .......... H04N 21/6581
2005/0264648 A1 * 12/2005 Ivashin ................ H04N 21/632
348/14.09
(Continued)

FOREIGN PATENT DOCUMENTS

CN  101047531 A  10/2007
CN  101141610 A  3/2008
(Continued)

OTHER PUBLICATIONS

Tencent Technology, ISR, PCT/CN2020/096818, dated Sep. 17, 2020, 2 pgs.

*Primary Examiner* — Nicholas R Taylor
*Assistant Examiner* — Chong G Kim
(74) *Attorney, Agent, or Firm* — Morgan, Lewis & Bockius LLP

(57) ABSTRACT

The present disclosure provides a multi-user instant messaging method performed by a server. The method includes: obtaining a first quantity of first multimedia data streams; merging the first quantity of first multimedia data streams into a second quantity of second multimedia data streams, the second quantity being less than the first quantity; and transmitting the second quantity of second multimedia data streams to a recipient terminal, wherein the recipient terminal presents the corresponding second multimedia data streams. Embodiments of the present disclosure can improve the compatibility with recipient terminals in a multi-user instant messaging process.

20 Claims, 14 Drawing Sheets

(51) Int. Cl.
*H04L 51/04* (2022.01)
*H04L 65/75* (2022.01)

(58) Field of Classification Search
USPC .......................................................... 709/204
See application file for complete search history.

(56) References Cited

U.S. PATENT DOCUMENTS

| | | | | |
|---|---|---|---|---|
| 2008/0062252 | A1* | 3/2008 | Kawamura | H04N 5/2624 348/E5.053 |
| 2009/0116563 | A1* | 5/2009 | Kawamura | H04N 5/265 375/E7.02 |
| 2009/0254657 | A1* | 10/2009 | Melnyk | H04N 21/6583 709/224 |
| 2012/0200658 | A1* | 8/2012 | Duckworth | H04N 7/152 348/14.07 |
| 2014/0245148 | A1* | 8/2014 | Silva | H04N 7/181 715/719 |
| 2015/0109403 | A1* | 4/2015 | Krishnan | H04N 7/155 348/14.08 |
| 2017/0201719 | A1* | 7/2017 | Choi | G06F 3/04847 |
| 2019/0394426 | A1 | 12/2019 | Segal | |
| 2020/0068171 | A1* | 2/2020 | Fadili | H04M 3/567 |
| 2022/0021846 | A1* | 1/2022 | Berger | H04N 7/15 |

FOREIGN PATENT DOCUMENTS

| | | |
|---|---|---|
| CN | 103634197 A | 3/2014 |
| CN | 104012040 A | 8/2014 |
| CN | 105763831 A | 7/2016 |
| CN | 108881783 A | 11/2018 |
| CN | 108965776 A | 12/2018 |
| CN | 109617992 A | 4/2019 |
| CN | 109640028 A | 4/2019 |
| CN | 109889549 A | 6/2019 |
| CN | 109951537 A | 6/2019 |
| CN | 110401811 A | 11/2019 |
| CN | 110661801 A | 1/2020 |
| CN | 111147362 A | 5/2020 |
| EP | 1320261 A1 | 6/2003 |

* cited by examiner

METHOD, SYSTEM, APPARATUS, AND ELECTRONIC DEVICE FOR MANAGING DATA STREAMS IN A MULTI-USER INSTANT MESSAGING SYSTEM

CROSS REFERENCE TO RELATED APPLICATIONS

This application is a continuation application of PCT Patent Application No. PCT/CN2020/096818, entitled "MULTI-PERSON INSTANT MESSAGING METHODS, SYSTEMS, DEVICES AND ELECTRONIC DEVICES" filed on Jun. 18, 2020, which claims priority to Chinese Patent Application No. 202010048012.7, filed with the State Intellectual Property Office of the People's Republic of China on Jan. 16, 2020, and entitled "MULTI-USER INSTANT MESSAGING METHOD, SYSTEM, APPARATUS, AND ELECTRONIC DEVICE", all of which are incorporated herein by reference in their entirety.

FIELD OF THE TECHNOLOGY

The present disclosure relates to the field of instant messaging technologies, and in particular, to a multi-user instant messaging method, system, apparatus, and electronic device.

BACKGROUND OF THE DISCLOSURE

With the rapid development of information technology, multi-user instant messaging is increasingly widely applied. With the expansion of the scale of communication and an increase in the number of users that participate in the same instant messaging room simultaneously, the following problems are exposed in the related art: In multi-user instant messaging, recipient terminals have varied conditions, and the multi-user technology communication in the related art has low compatibility with recipient terminals. As a result, adequate services fail to be provided to some recipient terminals.

SUMMARY

An objective of the present disclosure is to provide a multi-user instant messaging method, system, apparatus, and electronic device, which can improve the compatibility of multi-user instant messaging with recipient terminals.

According to an aspect of embodiments of the present disclosure, a multi-user instant messaging method is disclosed, the method being performed by a server, the method including:

obtaining a first quantity of first multimedia data streams;

merging the first quantity of first multimedia data streams into a second quantity of second multimedia data streams, the second quantity being less than the first quantity; and transmitting the second quantity of second multimedia data streams to a recipient terminal, wherein the recipient terminal presents the corresponding second multimedia data streams.

According to an aspect of the embodiments of the present disclosure, a multi-user instant messaging system is disclosed, including a scheduling node and at least two candidate data adapter nodes, the scheduling node being configured to select a candidate data adapter node from the at least two candidate data adapter nodes as a target data adapter node; and the target data adapter node being configured to: obtain a first quantity of first multimedia data streams, merge the first quantity of first multimedia data streams into a second quantity of second multimedia data streams, the second quantity being less than the first quantity, and transmit the second quantity of second multimedia data streams to a recipient terminal, wherein the recipient terminal presents the corresponding second multimedia data streams.

According to an aspect of the embodiments of the present disclosure, a multi-user instant messaging apparatus is disclosed, including:

an obtaining module, configured to obtain a first quantity of first multimedia data streams;

a merging module, configured to merge the first quantity of first multimedia data streams into a second quantity of second multimedia data streams, the second quantity being less than the first quantity; and a transmission module, configured to transmit the second quantity of second multimedia data streams to a recipient terminal, wherein the recipient terminal presents the corresponding second multimedia data streams.

According to an aspect of the embodiments of the present disclosure, a server for performing multi-user instant messaging is disclosed, including: a memory, storing computer-readable instructions; and a processor, reading the computer-readable instructions stored in the memory to perform the multi-user instant messaging method.

According to an aspect of the embodiments of the present disclosure, a non-transitory computer-readable storage medium is disclosed, the computer-readable storage medium storing computer-readable instructions, the computer-readable instructions being performed by a processor to implement the multi-user instant messaging method.

In the embodiments of the present disclosure, in multi-user instant messaging, after first multimedia data streams uploaded by transmitters are obtained, the obtained first multimedia data streams are merged to obtain a smaller quantity of second multimedia data streams, and the second multimedia data streams are then transmitted to a recipient, thereby reducing the bandwidth requirements for recipient terminals during data receiving and improving the compatibility with recipient terminals.

Other features and advantages of the present disclosure will be apparent through the following detailed description, or partly learned through practice of the present disclosure.

It can be understood that the above general descriptions and the following detailed descriptions are merely exemplary, and cannot limit the present disclosure.

BRIEF DESCRIPTION OF THE DRAWINGS

The above and other objectives, features, and advantages of the present disclosure will become more apparent from the detailed description of exemplary embodiments with reference to the accompanying drawings.

DESCRIPTION OF EMBODIMENTS

Figure 1:
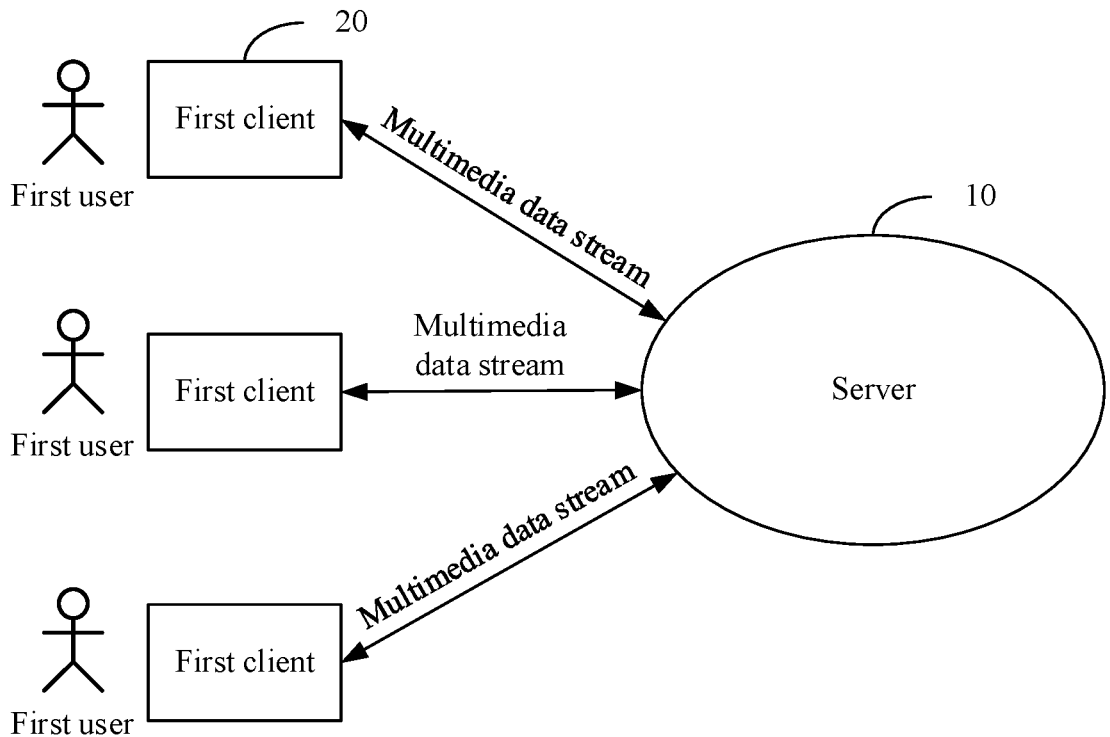
FIG. 1 shows the basic architectural structure of multi-user instant messaging according to an embodiment of the present disclosure.

The examples of implementations are described comprehensively with reference to the accompanying drawings. However, the exemplary implementations may be implemented in a plurality of forms, and are not limited to the examples described herein. On the contrary, such exemplary implementations are provided to make the description of the present disclosure more comprehensive and complete, and fully convey the concepts of the exemplary implementations to a person skilled in the art. The accompanying drawings are merely exemplary illustrations of the present disclosure and are not necessarily drawn to scale. The same reference numbers in the drawings represent the same or similar parts, and therefore, repeated descriptions thereof are omitted.

In addition, the described features, structures, or characteristics may be combined in one or more exemplary implementations in any appropriate manner. In the following descriptions, a lot of specific details are provided to give a comprehensive understanding of the exemplary implementations of the present disclosure. However, a person skilled in the art is to be aware that, the technical solutions in the present disclosure may be implemented without one or more of the particular details, or another method, component, or step may be used. In other cases, known structures, methods, implementations, or operations are not shown or described in detail to avoid obscuring aspects of the present disclosure.

Some of the block diagrams shown in the accompanying drawings are functional entities and do not necessarily correspond to physically or logically independent entities. Such functional entities may be implemented by using software, or implemented in one or more hardware modules or integrated circuits, or implemented in different networks and/or processor apparatuses and/or micro-controller apparatuses.

First, the concepts involved in the embodiments of the present disclosure are briefly described.

A first multimedia data stream is a multimedia data stream that has not been processed by a server.

A second multimedia data stream is a multimedia data stream that is obtained through merging by the server and is to be transmitted to a recipient.

Audio mixing is a process of mixing a plurality of pieces of audio, for example, mixing a plurality of pieces of audio into one piece of audio. After the plurality of pieces of audio that have undergone the audio mixing are played by a recipient, the plurality of pieces of audio can be simultaneously played by the recipient.

Video mixing is a process of mixing a plurality of videos, for example, mixing a plurality of videos into one video. After a plurality of videos that have undergone the video mixing are played by a recipient, the plurality of videos can be simultaneously presented on a screen of the recipient. For example, four videos are mixed into one video. After the one video is played by the recipient, the four videos can be simultaneously presented on the screen of the recipient in a four-square grid layout (the specific layout may be customized by the recipient; for example, the recipient presets parameters related to a video display template).

The architecture of the embodiments of the present disclosure is described below with reference to FIG. 1 and FIG. 2.

FIG. 1 shows the basic architectural structure of an embodiment of the present disclosure, including a server 10 and first clients 20. The first clients 20 transmit and receive multimedia data streams with each other through the server 10, to implement multi-user instant messaging. Each first client 20 may act as a transmitter that transmits a first multimedia data stream acquired and generated by the first client to the server 10. The each first client 20 may act as a recipient terminal that receives, from the server 10, a second multimedia data stream that is obtained by merging first multimedia data streams acquired and generated by a plurality of first clients 20. Specifically, the server 10 may receive the first multimedia data stream transmitted by the each first client 20, merge the received first multimedia data streams to obtain a smaller quantity of second multimedia data streams that occupy less bandwidth and then transmit the obtained second multimedia data streams to recipient terminals. This method is used to reduce the bandwidth requirements for recipient terminals and improve the compatibility of multi-user instant messaging with recipient terminals.

For example, in a multi-user video conference, all five participants use multimedia acquisition devices (for example, microphones and cameras) to upload the participants' multimedia data streams (for example, audio data streams that can present the participants' voice and video data streams that can present the participants' images) to a server. The server receives five multimedia data streams. The server merges the five multimedia data streams into one multimedia data stream, and then transmits the one multimedia data stream to each participant. In this way, the each participant can present in real time the multimedia (for example, videos corresponding to the multimedia data streams and audio corresponding to the multimedia data streams) that all the five participants want to present, and only needs to receive the one multimedia data stream.

This embodiment is only an exemplary description, and does not limit the function and scope of use of the present disclosure.

Figure 2:
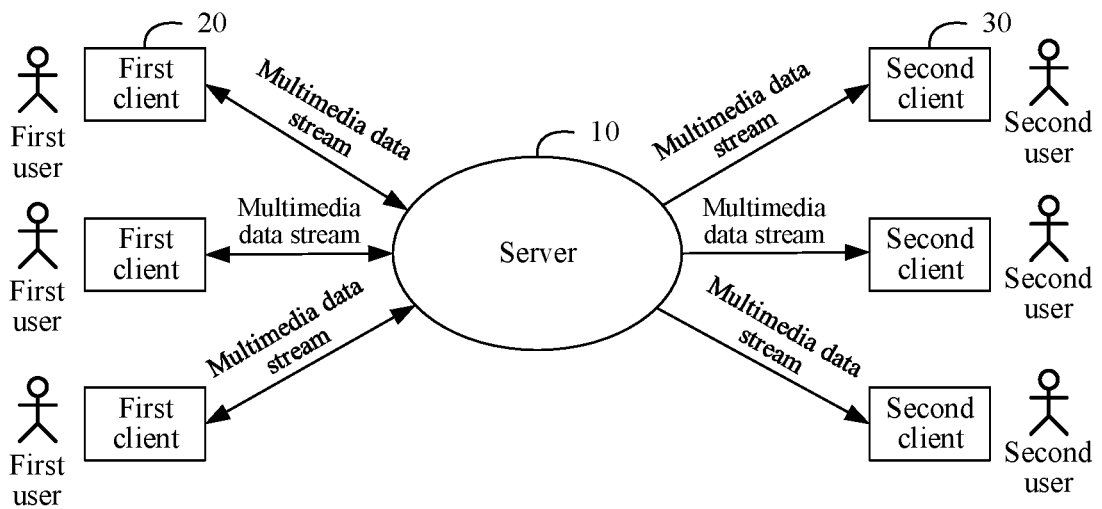
FIG. 2 shows the architectural structure of multi-user instant messaging according to an embodiment of the present disclosure.

FIG. 2 shows the architectural structure of an embodiment of the present disclosure, including a server 10, first clients 20, and second clients 30. The first clients 20 transmit and receive multimedia data streams with each other through the server 10, and the second clients 30 may receive multimedia data streams through the server 10, to implement multi-user instant messaging. Each first client 20 may act as a transmitter that transmits a first multimedia data stream acquired and generated by the first client to the server 10. The each first client 20 or each second client 30 may act as a recipient that receives, from the server 10, a second multimedia data stream that is obtained by merging first multimedia data streams acquired and generated by a plurality of first clients 20. Specifically, the server 10 may receive the first multimedia data stream transmitted by the each first client 20, merge the received first multimedia data streams to obtain a smaller quantity of second multimedia data streams that occupy less bandwidth and then transmit the obtained second multimedia data streams to recipient terminals. This method is used to reduce the bandwidth requirements for recipient terminals and improve the compatibility of multi-user instant messaging with recipient terminals.

For example, in a multi-user live streaming scenario, five streamers have successively joined the same online live streaming room for live streaming. 1,000 viewers are watching the live streaming in the online live streaming room. During the live streaming, the five streamers upload the participants' audio and video data streams to a server by using audio and video capture devices (microphones and cameras). The server receives five audio and video data streams. The server merges the five audio and video data streams into one audio and video data stream and then transmits the one audio and video data stream to each streamer and each viewer. In this way, the five streamers and the 1,000 viewers can watch the videos of all the five streamers and hear the audio of all the five streamers, and only need to receive and play the one audio and video data stream.

This embodiment is only an exemplary description, and does not limit the function and scope of use of the present disclosure.

A specific implementation process of the multi-user instant messaging method provided in the embodiments of the present disclosure is described below in detail.

Figure 3:
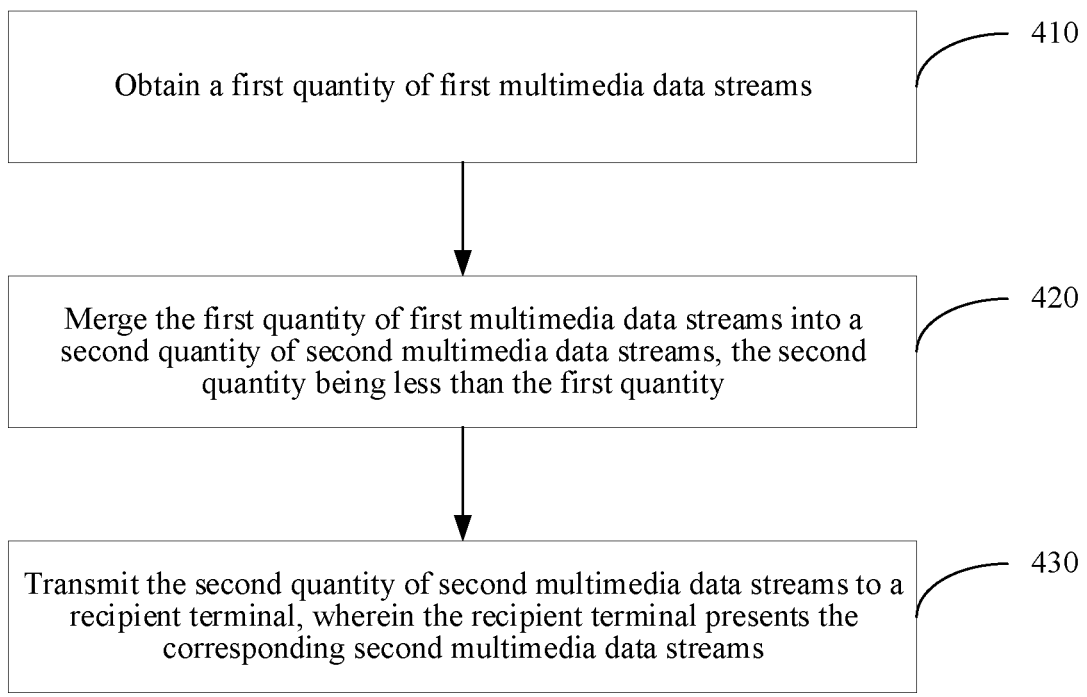
FIG. 3 is a flowchart of a multi-user instant messaging method according to an embodiment of the present disclosure.

FIG. 3 shows a multi-user instant messaging method, including the following steps:

Step 410: Obtain a first quantity of first multimedia data streams.

Step 420: Merge the first quantity of first multimedia data streams into a second quantity of second multimedia data streams, the second quantity being less than the first quantity.

Step 430: Transmit the second quantity of second multimedia data streams to a recipient, so that the recipient terminal presents the corresponding second multimedia data streams.

In the embodiments of the present disclosure, in multi-user instant messaging, after first multimedia data streams uploaded by transmitters are obtained, the obtained first multimedia data streams are merged to obtain a smaller quantity of second multimedia data streams, and the second multimedia data streams are then transmitted to a recipient. In this case, the bandwidth requirements for recipient terminals during data receiving are reduced and the compatibility with recipient terminals is improved.

In step 410, the first quantity of first multimedia data streams are obtained.

In the embodiment of the present disclosure, in multi-user instant messaging, for each transmitter, the server receives at least one corresponding first multimedia data stream. For example, in a multi-user video conference, for each participant, the server receives at least one multimedia data stream transmitted by the participant.

In an embodiment, the obtaining a first quantity of first multimedia data streams includes: obtaining, after connections are separately established with the first quantity of transmitters, corresponding first multimedia data streams uploaded by the first quantity of transmitters through the corresponding connections.

In this embodiment, each transmitter transmits the corresponding one first multimedia data stream to the server. Specifically, the server first separately establishes connections with the first quantity of transmitters in the multi-user instant messaging. After the connections are established, the corresponding transmitter may upload, to the server in real time, the first multimedia data streams acquired and generated by the transmitter.

For example, in a multi-user video conference, five participants first separately establish connections with the server to transmit and receive data. During the conference, each participant uses a multimedia acquisition device to upload the participant's multimedia data stream to the server through the corresponding connection in real time. The server obtains five multimedia data streams, and the five multimedia data streams are subsequently processed by the server, so that the each participant can be seen and heard by other participants.

This embodiment is only an exemplary description, and does not limit the function and scope of use of the present disclosure.

In step 420, the first quantity of first multimedia data streams are merged into a second quantity of second multimedia data streams, the second quantity being less than the first quantity.

In step 430, the second quantity of second multimedia data streams are transmitted to a recipient, and the recipient terminal presents the corresponding second multimedia data streams.

In the embodiment of the present disclosure, after obtaining the first quantity of first multimedia data streams, the server merges the first quantity of first multimedia data streams into a smaller quantity of second multimedia data streams, that is, the second quantity of second multimedia data streams. Because the second quantity is less than the first quantity, the bandwidth requirements for recipient terminals are reduced and the compatibility with recipient terminals is improved.

In an embodiment, the merging the first quantity of first multimedia data streams into a second quantity of second multimedia data streams includes:

separating corresponding first audio data streams from the first multimedia data streams; and performing audio mixing on the separated first audio data streams to obtain the second quantity of second multimedia data streams.

In this embodiment, the obtained first multimedia data streams may only include audio data or may include both audio data and video data. Meanwhile, the second multimedia data streams to be transmitted to the recipient only include audio data. Correspondingly, after the recipient receives the second multimedia data streams, only the corresponding audio can be played.

Specifically, according to specific application scenarios, if the server is configured in advance to only transmit audio data or the server determines that the recipient can only receive audio data, after the server obtains the first quantity of first multimedia data streams, the corresponding first audio data streams are separated from each first multimedia data stream, and audio mixing is performed on the separated first audio data streams are, to obtain the second quantity of second multimedia data streams that include only audio data and are to be transmitted to the recipient.

For example, on a live streaming platform A, five streamers are live-streaming in the same online live streaming room simultaneously. Meanwhile, the live streaming platform A and a radio station platform B cooperate to attract customers. Live content on the live streaming platform A can be synchronously streamed on the radio station platform B.

During the live streaming, each streamer uploads the streamer's multimedia data stream (including audio data and video data that can present streamer's images) to a server A of the live streaming platform A and synchronously uploads the multimedia data stream to a server B of the radio station platform B. Because of the service requirements of the radio station platform B, the server B is configured in advance to only transmit audio data.

After the server B obtains the corresponding five multimedia data streams, the corresponding audio data streams are separated from each multimedia data stream, and audio mixing is performed on the separated audio data streams to obtain one multimedia data stream that includes only the audio data and is to be transmitted to the recipient.

In another example, on a live streaming platform A, five streamers are live-streaming in the same online live streaming room simultaneously. During the live streaming, each streamer uploads the streamer's multimedia data stream (including audio data and video data that can present the streamer's images) to a server A of the live streaming platform A.

It is temporarily inconvenient for a viewer named Michael in the online live streaming room to watch the video for his own reasons. Therefore, Michael adjusts the viewing line of the online live streaming room, that is, selects "Audio-only line". After receiving a signal from Michael to adjust the viewing line to "Audio-only line", the server A determines that Michael can only receive audio data.

In a case that Michael is the recipient, after the server A obtains the corresponding five multimedia data streams, the corresponding audio data streams are separated from each multimedia data stream, and audio mixing is performed on the separated audio data streams to obtain one multimedia data stream that includes only the audio data and is to be transmitted to the recipient.

The advantage of this embodiment is that audio mixing is performed on the separated first audio data streams, so that a smaller quantity of second multimedia data streams can be obtained and the bandwidth requirements for recipient terminals can be reduced.

This embodiment is only an exemplary description, and does not limit the function and scope of use of the present disclosure.

In an embodiment, before the performing audio mixing on the separated first audio data streams, the method further includes: removing, if one first multimedia data stream originates from the recipient, the first audio data stream separated from the first multimedia data streams.

That is, for a target multimedia data streams, if the target multimedia data stream originates from the recipient, the first audio data stream separated from the target multimedia data stream is removed. The target multimedia data stream is any one of the first quantity of first multimedia data streams.

In this embodiment, before audio mixing is performed on the separated first audio data streams, for each recipient, it is determined whether one first multimedia data stream of the obtained first multimedia data streams originates from the recipient. If yes, the first audio data stream separated from the first multimedia data streams is removed. In this way, the second multimedia data streams received by the recipient do not include audio data of the recipient.

For example, five streamers are live-streaming in the same online live streaming room simultaneously. Each of the five streamers acts as a transmitter as well as a recipient of the multimedia data streams, the recipient receiving multimedia data streams from other streamers to watch and hear videos and audio of other streamers. The five multimedia data streams obtained by the server include the audio data of the streamer. Obviously, if the streamer receives the streamer's audio data stream from the server and plays the streamer's audio, causing interference with the streamer.

Therefore, after the server obtains the five multimedia data streams and separates each audio data stream, for a specific streamer, the audio data stream separated from the multimedia data streams from the streamer is removed, and audio mixing is performed on only the four audio data streams separated from the multimedia data streams of the other four streamers, to obtain one multimedia data stream that includes only the audio data of the other four streamers and is to be transmitted to the recipient. In this way, the streamer is prevented from interference by the streamer's own audio.

The advantage of this embodiment is that if one first multimedia data stream originates from the recipient, the first audio data stream separated from the first multimedia data streams is removed, so that the recipient is prevented from interference by the recipient's audio.

This embodiment is only an exemplary description, and does not limit the function and scope of use of the present disclosure.

In an embodiment, the merging the first quantity of first multimedia data streams into a second quantity of second multimedia data streams includes:

separating corresponding first video data streams from the first multimedia data streams; and performing video mixing on the separated first video data streams to obtain the second quantity of second multimedia data streams.

In this embodiment, the obtained first multimedia data streams may only include video data or may include both audio data and video data. Meanwhile, the second multimedia data streams to be transmitted to the recipient only include video data. Correspondingly, after the recipient receives the second multimedia data streams, only the corresponding video can be played.

Specifically, according to a specific application scenario, if the server is configured in advance to only transmit video data or the server determines that the recipient can only receive video data, after the server obtains the first quantity of first multimedia data streams, the corresponding first video data streams are separated from each first multimedia data stream, and video mixing is performed on the separated first video data streams, to obtain the second quantity of second multimedia data streams that include only video data and are to be transmitted to the recipient.

For example, on a live streaming platform A, five streamers are live-streaming in the same online live streaming room simultaneously. During the live streaming, each streamer uploads the streamer's multimedia data stream (including audio data that can present the streamer's voice and video data that can present the streamer's images) to a server A of the live streaming platform A.

As a viewer in the online live streaming room, Michael only needs to watch the video considering the live content (for example, the live content is that the five streamers collaborate to draw paintings) or for his own reasons (for example, saving data traffic). Therefore, Michael adjusts the viewing line of the online live streaming room, that is, selects "Audio-only line". After receiving the signal from Michael to adjust the viewing line to "Video-only line", the server A determines that Michael can only receive video data.

In a case that Michael is the recipient, after the server A obtains the corresponding five multimedia data streams, the corresponding video data streams are separated from each multimedia data stream, and video mixing is performed on the separated video data streams to obtain one multimedia data stream that includes only the video data and is to be transmitted to the recipient. Therefore, after a terminal (for example, a mobile phone or a computer) of Michael receives the one multimedia data stream, the videos of corresponding streamers can be separately displayed in five areas (for example, a box area of a predetermined size in the upper right corner of the screen, a box area of a predetermined size in the lower right corner of the screen, a box area of a predetermined size in the upper left corner of the screen, a box area of a predetermined size in the lower left corner of the screen, and a box area of a predetermined size in the middle of the screen) on the screen of the terminal for Michael to watch.

The advantage of this embodiment is that video mixing is performed on the separated first video data streams, so that a smaller quantity of second multimedia data streams can be obtained and the bandwidth requirements for recipient terminals can be reduced.

This embodiment is only an exemplary description, and does not limit the function and scope of use of the present disclosure.

In an embodiment, the merging the first quantity of first multimedia data streams into a second quantity of second multimedia data streams includes:

separating corresponding first audio data streams from the first multimedia data streams; and separating corresponding first video data streams from the first multimedia data streams; and performing audio mixing on the separated first audio data streams;

performing video mixing on the separated first video data streams; and obtaining the second quantity of second multimedia data streams based on the first audio data streams that have undergone the audio mixing and the first video data streams that have undergone the video mixing.

In this embodiment, the obtained first multimedia data streams include both audio data and video data. Meanwhile, the second multimedia data streams to be transmitted to the recipient include both the audio data and the video data. Correspondingly, after the recipient receives the second multimedia data streams, the corresponding audio and video can be played.

Specifically, after the server obtains the first quantity of first multimedia data streams, the corresponding first audio data streams are separated from each first multimedia data stream, and audio mixing is performed on the separated first audio data streams. The corresponding first video data streams are separated from each first multimedia data stream, and video mixing is performed on the separated first video data streams. Based on the separated first audio data streams and the separated first video data streams, the second quantity of second multimedia data streams that include both the audio data and the video data and are to be transmitted to the recipient are obtained (for example, the separated first audio data streams and the separated first video data streams are combined into one packet, to obtain one second multimedia data stream that includes both the audio data and the video data and is to be transmitted to the recipient. Alternatively, the separated first audio data streams are combined into one packet, and the separated first video data streams are combined into another packet, to obtain two second multimedia data streams that include both the audio data and the video data and are to be transmitted to the recipient).

For example, on a live streaming platform A, five streamers are live-streaming in the same online live streaming room simultaneously. During the live streaming, each streamer uploads the streamer's multimedia data stream (including audio data that can present the streamer's voice and video data that can present the streamer's images) to a server A of the live streaming platform A.

After the server A obtains the corresponding five multimedia data streams, the corresponding audio data streams are separated from each multimedia data stream, and audio mixing is performed on the separated audio data streams. The corresponding video data streams are separated from each multimedia data stream, and video mixing is performed on the separated video data streams. The audio data streams that have undergone the audio mixing and the video data streams that have undergone the video mixing are combined into one packet, to obtain one multimedia data stream that includes both the audio data and the video data and is to be transmitted to the recipient.

In this case, after the terminal of Michael receives the one multimedia data stream, the corresponding videos of the streamers can be separately displayed in five areas on the screen of the terminal, and the audio of the five streamers can be played.

The advantage of this embodiment is that audio mixing is performed on the separated first audio data streams and video mixing is performed on the separated first video data streams, so that a smaller quantity of second multimedia data streams can be obtained and the bandwidth requirements for recipient terminals can be reduced.

This embodiment is only an exemplary description, and does not limit the function and scope of use of the present disclosure.

In an embodiment, the merging the first quantity of first multimedia data streams into a second quantity of second multimedia data streams includes:

converting, based on attribute configuration information, the first quantity of first multimedia data streams into the first quantity of first multimedia data streams matching the attribute configuration information; and merging the first quantity of first multimedia data streams matching the attribute configuration information into the second quantity of second multimedia data streams matching the attribute configuration information, where before the first quantity of first multimedia data streams are merged into a second quantity of second multimedia data streams, the attribute configuration information preset by the recipient for multimedia playback is obtained.

The attribute configuration information is information used for indicating a presentation attribute of a corresponding multimedia data stream. For example, the multimedia data stream is a video data stream. The presentation attribute includes a video resolution, a video bitrate, a video display template, and the like.

In this embodiment, the recipient may preset corresponding attribute configuration information (for example, a video resolution, a video bitrate, and a video display template) for multimedia playback. Before merging the first quantity of first multimedia data streams into a second quantity of second multimedia data streams, the server obtains the attribute configuration information corresponding to the recipient.

When the server merges the first quantity of first multimedia data streams into a second quantity of second multimedia data streams, based on the attribute configuration information, an attribute conversion is performed on the first quantity of first multimedia data streams to obtain the first quantity of first multimedia data streams matching the attribute configuration information. The first quantity of first multimedia data streams matching the attribute configuration information are merged into the second quantity of second multimedia data streams matching the attribute configuration information. The server may transmit the second quantity of second multimedia data streams matching the attribute configuration information to the recipient, so that the recipient can present the multimedia matching the attribute configuration information.

For example, on a live streaming platform A, five streamers are live-streaming in the same online live streaming room simultaneously. During the live streaming, each streamer uploads the streamer's multimedia data stream to a server A of the live streaming platform A.

Michael, as a viewer in the online live streaming room, for his own reasons (for example, a slow network speed, low maximum display resolution of a mobile phone), presets the configuration of "Video resolution: 480P" for video playback, and the server A obtains in advance the attribute configuration information "Video resolution: 480P" preset by Michael.

In a case that Michael is the recipient, after the server A obtains the corresponding five multimedia data streams, the five multimedia data streams are converted into five multimedia data streams with a video resolution of 480P. The five multimedia data streams with a video resolution of 480P are merged into one multimedia data stream that has a video resolution of 480P and is to be transmitted to Michael. Therefore, after the terminal of Michael receives the one multimedia data stream, multimedia with a video resolution of 480P can be played.

The advantage of this embodiment is that the attribute configuration information preset by the recipient is obtained and the multimedia data stream is correspondingly processed, make it unnecessary for the recipient to process the received second multimedia data streams, thereby reducing the processing burden of the recipient.

This embodiment is only an exemplary description, and does not limit the function and scope of use of the present disclosure.

In an embodiment, after the merging the first quantity of first multimedia data streams into a second quantity of second multimedia data streams, the method includes: converting, based on attribute configuration information, the second quantity of second multimedia data streams into the second quantity of second multimedia data streams matching the attribute configuration information; and obtaining, before the second quantity of second multimedia data streams are transmitted to a recipient, the attribute configuration information of the recipient for multimedia playback.

In this embodiment, the recipient may preset corresponding attribute configuration information (for example, a video resolution, a video bitrate, and a video display template) for multimedia playback. Before merging the first quantity of first multimedia data streams into a second quantity of second multimedia data streams, the server obtains the attribute configuration information corresponding to the recipient.

After the server merges the first quantity of first multimedia data streams into a second quantity of second multimedia data streams, based on the attribute configuration information, an attribute conversion is performed on the second quantity of second multimedia data streams to obtain the second quantity of second multimedia data streams matching the attribute configuration information. The server may transmit the second quantity of second multimedia data streams matching the attribute configuration information to the recipient, so that the recipient can present the multimedia matching the attribute configuration information.

For example, on a live streaming platform A, five streamers are live-streaming in the same online live streaming room simultaneously. During the live streaming, each streamer uploads the streamer's multimedia data stream to a server A of the live streaming platform A.

Michael, as a viewer in the online live streaming room, for his own reasons (for example, a slow network speed, low maximum display resolution of a mobile phone), presets the configuration of "Video resolution: 480P" for video playback, and the server A obtains in advance the attribute configuration information "Video resolution: 480P" preset by Michael.

In a case that Michael is the recipient, after the server A merges the obtained corresponding five multimedia data streams into one multimedia data stream that has a video resolution of 480P and is to be transmitted to Michael, the one multimedia data stream is converted into one multimedia data stream that has a video resolution of 480P and is to be transmitted to Michael. Therefore, after the terminal of Michael receives the one multimedia data stream, multimedia with a video resolution of 480P can be played.

The advantage of this embodiment is that the attribute configuration information preset by the recipient is obtained and the multimedia data stream is correspondingly processed, make it unnecessary for the recipient to process the received second multimedia data streams, thereby reducing the processing burden of the recipient.

This embodiment is only an exemplary description, and does not limit the function and scope of use of the present disclosure.

An embodiment of the present disclosure further provides a multi-user instant messaging system.

Figure 4:
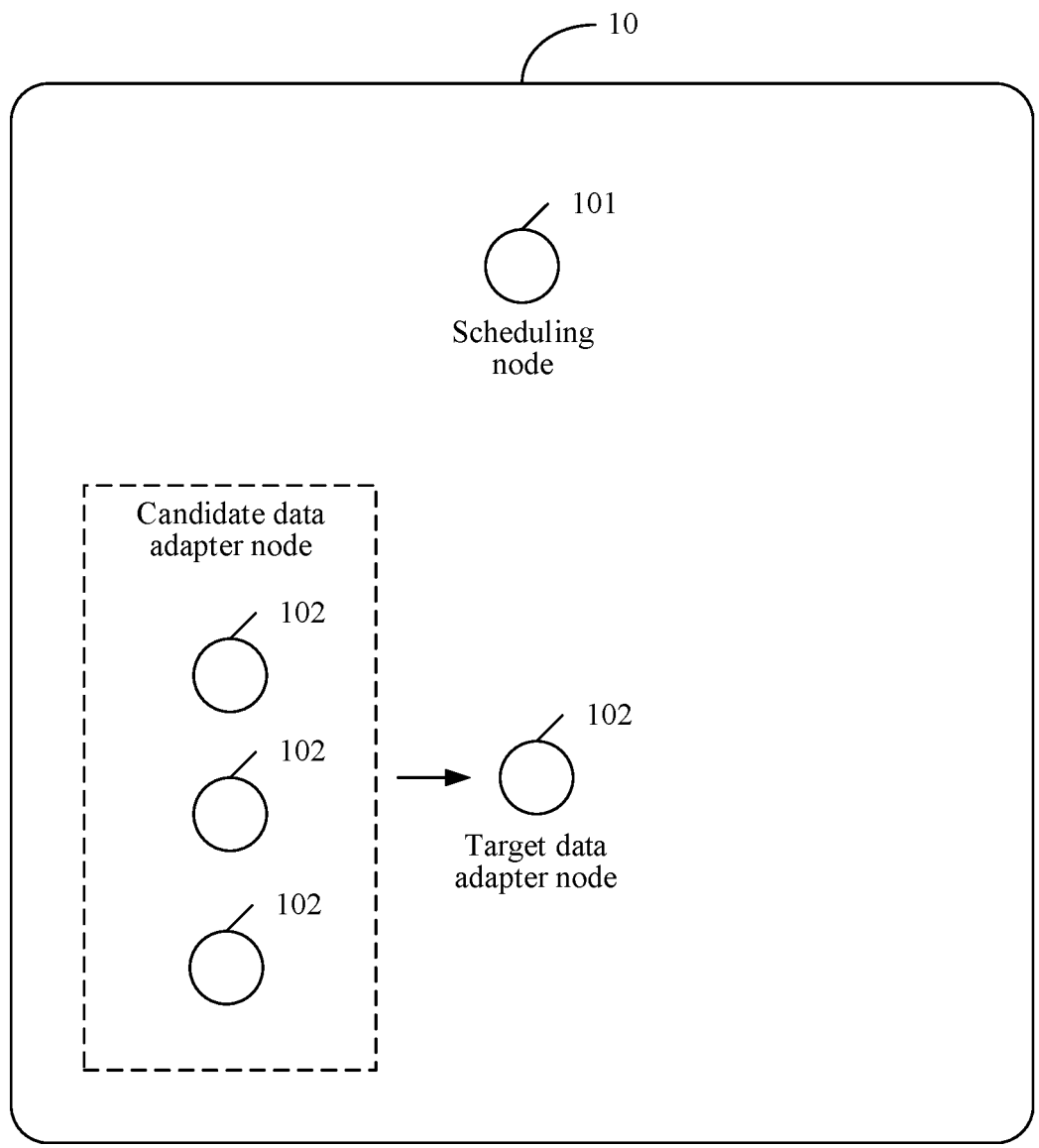
FIG. 4 shows the structure of a multi-user instant messaging system according to an embodiment of the present disclosure.

As shown in FIG. 4, a multi-user instant messaging system according to an embodiment of the present disclosure includes a scheduling node 101 and at least two candidate data adapter nodes 102. The scheduling node 101 is configured to select a candidate data adapter node from the at least two candidate data adapter nodes 102 as a target data adapter node.

The target data adapter node is configured to: obtain a first quantity of first multimedia data streams, merge the first quantity of first multimedia data streams into a second quantity of second multimedia data streams, the second quantity being less than the first quantity, and transmit the second quantity of second multimedia data streams to a recipient, so that the recipient terminal presents the corresponding second multimedia data streams.

The multi-user instant messaging system provided in the embodiments of the present disclosure is a multipoint control unit (MCU) system established based on a distributed system. The target data adapter node configured to perform data processing (obtaining a first quantity of first multimedia data streams; merging the first quantity of first multimedia data streams into a second quantity of second multimedia data streams, the second quantity being less than the first quantity; and transmitting the second quantity of second multimedia data streams to a recipient, so that the recipient terminal presents the corresponding second multimedia data streams) in the multi-user instant messaging is selected from the candidate data adapter nodes that are disposed in a distributed manner. The nodes in the multi-user instant messaging system may be separately disposed on machines located in different physical locations. For example, the scheduling node is disposed on a server in Shenzhen. One of the candidate data adapter nodes is disposed on a server in Guangzhou, and the other candidate data adapter node is disposed on a server in Hangzhou.

The multi-user instant messaging system merges the first quantity of first multimedia data streams and transmits a smaller quantity of second quantity of second multimedia data streams to the recipient, thereby reducing the bandwidth requirements for recipient terminals and improving the compatibility with recipient terminals. Meanwhile, the multi-user instant messaging system is established on a distributed system, and processing processes of parts of the multi-user instant messaging system can be flexibly allocated to distributed nodes, thereby improving the flexibility of the processing process of the multi-user instant messaging system. Moreover, the multi-user instant messaging system is established on a distributed system and provides powerful parallel expandability, to easily provide one hundred thousand or one million users with a multi-user instant messaging service in the same communication room.

In an embodiment, the scheduling node is configured to:
periodically obtain operating status information separately corresponding to the candidate data adapter nodes;
obtain status scores corresponding to the candidate data adapter nodes based on the operating status information; and
select the target data adapter node from the candidate data adapter nodes based on the status scores.

In this embodiment, the scheduling node periodically obtains the operating status information corresponding to each candidate data adapter node (for example, load information of the candidate data adapter node). When a target data adapter node needs to be selected (for example, when a plurality of streamers live-stream in the same online live streaming room, a scheduling node needs to select a target data adapter node, so that the target data adapter node obtains a first quantity of first multimedia data streams, merges the first quantity of first multimedia data streams into a second quantity of second multimedia data streams, and transmits the second quantity of second multimedia data streams to a recipient), the scheduling node may measure, based on the operating status information of the candidate data adapter nodes, the performance of the operating status of the candidate data adapter nodes, the performance being reflected by a status score. Based on the status scores, the target data adapter node is selected from the candidate data adapter nodes.

Based on the operating status information, the status scores of the candidate data adapter nodes are obtained, and the performance of the operating attributes in the operating status information may be measured separately to obtain an attribute score corresponding to the each operating attribute. The attribute scores are added or the attribute scores are weighted according to the weights assigned in advance to the operating attributes to obtain the corresponding status scores.

The target data adapter node is selected from the candidate data adapter nodes based on the status scores. The candidate data adapter node with the highest status score may be selected as the target data adapter node. Alternatively, one of the candidate data adapter nodes that rank top three in descending order of status scores may be randomly selected as the target data adapter node.

The advantage of this embodiment is that the target data adapter node is selected based on the status scores, so that the processing efficiency of the selected target data adapter node can be flexibly ensured.

This embodiment is only an exemplary description, and does not limit the function and scope of use of the present disclosure.

In an embodiment, the scheduling node obtains the operating status information separately corresponding to the candidate data adapter nodes through a blockchain system. For example, in this embodiment, each candidate data adapter node is separately used as a blockchain node in the blockchain system. Based on a preset consensus algorithm, a consensus is periodically reached on the operating status information of the candidate data adapter nodes, the operating status information is packed into a data block, and the data block is linked to the chain (the data block is linked into the blockchain). Therefore, the scheduling node may obtain the operating status information separately corresponding to each candidate data video by querying the latest data block in the blockchain.

Figure 5A:
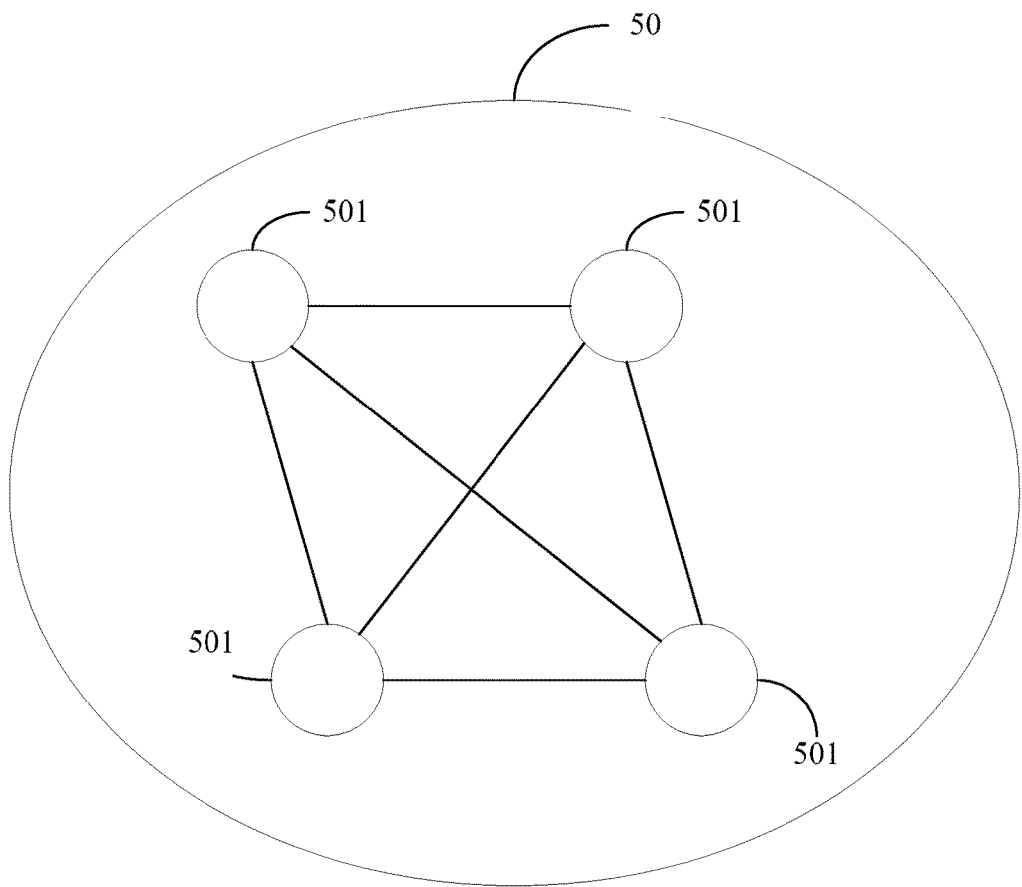
FIG. 5A shows the structure of a blockchain system according to an embodiment of the present disclosure.

The blockchain system is a system used for data sharing among nodes. Referring to a blockchain system 50 shown in FIG. 5A, the blockchain system may include a plurality of nodes 501, and the plurality of nodes 501 may be clients in the blockchain system. Each node 501 may receive inputted information during normal operating, and maintain shared data in the blockchain system based on the received inputted information. To ensure the interchange of information in the blockchain system, there may be information connections among nodes in the blockchain system, and the nodes may transmit information through the information connections. For example, when any node in the blockchain system receives inputted information, other nodes in the blockchain system obtain the inputted information according to a consensus algorithm, and store the inputted information as shared data, so that data stored in all nodes in the blockchain system is consistent.

Each node in the blockchain system has a corresponding node identifier, and the each node in the blockchain system may store the node identifiers of other nodes in the blockchain system, to subsequently broadcast the generated block to other nodes in the blockchain system according to the node identifiers of other nodes. The each node may maintain a node identifier list shown in the following table, and correspondingly store node names and the node identifiers in the node identifier list. The node identifier may be an internet protocol (IP) address and any other type of information that can be used to identify the node. Table 1 only uses the IP address as an example for description.

TABLE 1

Node Identifier List

| Node name | Node identifier |
|---|---|
| Node 1 | 117.114.151.174 |
| Node 2 | 117.116.189.145 |
| ... | ... |
| Node N | 119.123.789.258 |

Figure 5B:
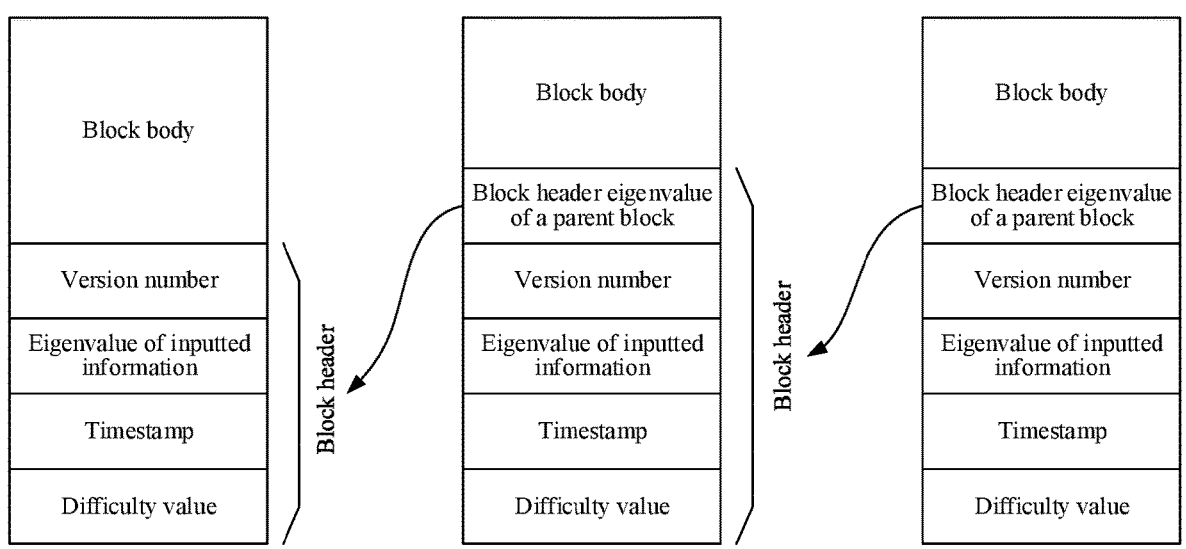
FIG. 5B shows the structure of a block in a blockchain system according to an embodiment of the present disclosure.

Each node in the blockchain system stores the same blockchain. The blockchain is composed of a plurality of blocks. Referring to FIG. 5B, the blockchain is composed of a plurality of blocks. A genesis block includes a block header and a block body. The block header stores an inputted information eigenvalue, a version number, a timestamp, and a difficulty value. The block body stores inputted information. The genesis block is a parent block of a next block of the genesis block. The next block also includes a block header and a block body. The block header stores an inputted information eigenvalue of the current block and a block header eigenvalue of a parent block, a version number, a timestamp, and a difficulty value. The rest is deduced by analogy. In this case, block data stored in each block in the blockchain is related to block data stored in the parent block, to ensure the security of the inputted information in a block.

Figure 5C:
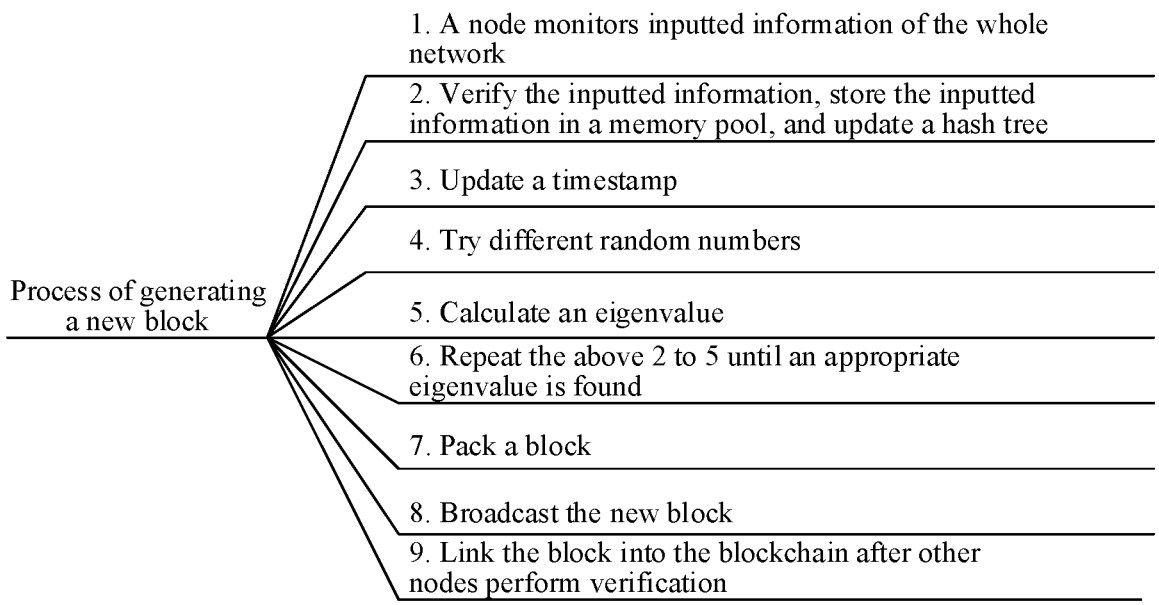
FIG. 5C shows a process of generating a new block according to an embodiment of the present disclosure.

When blocks are generated in the blockchain, referring to FIG. 5C, when a node where the blockchain is located receives the inputted information, the inputted information is verified. After the verification is completed, the inputted information is stored in a memory pool, and a hash tree used for recording the inputted information is updated. Next, the timestamp is updated to the time when the inputted information is received, different random numbers are tried, and eigenvalue calculation is performed a plurality of times, so that the calculated eigenvalue may satisfy the following formula:

$$SHA256(SHA256(version+prev\_hash+merkle\_root+ntime+nbits+x))<TARGET$$

SHA256 is an eigenvalue algorithm used for calculating an eigenvalue; version (a version number) is version information of the related block protocol in the blockchain; prev_hash is a block header eigenvalue of the parent block of the current block; merkle_root is an eigenvalue of inputted information; ntime is the update time of updating a timestamp; nbits is current difficulty, and is a fixed value within a period of time and is redetermined after the fixed period of time; and x is a random number; and TARGET is an eigenvalue threshold. The eigenvalue threshold may be determined and obtained according to nbits.

In this way, when a random number satisfying the above formula is obtained through calculation, information may be correspondingly stored, and a block header and a block body are generated, to obtain a current block. Subsequently, the node where the blockchain is located transmits, according to the node identifiers of other nodes in the blockchain system, a newly generated block to the other nodes in the blockchain system in which the node is located, and the other nodes verify the newly generated block and add the newly generated block after the verification to the blockchain stored in other nodes.

The advantage of this embodiment is that the operating status information of the candidate data adapter node is managed by using the blockchain system, so that the transparency and security of managing the operating status information are improved, and the scheduling node can more conveniently obtain the operating status information of the candidate data adapter nodes.

This embodiment is only an exemplary description, and does not limit the function and scope of use of the present disclosure.

Figure 6:
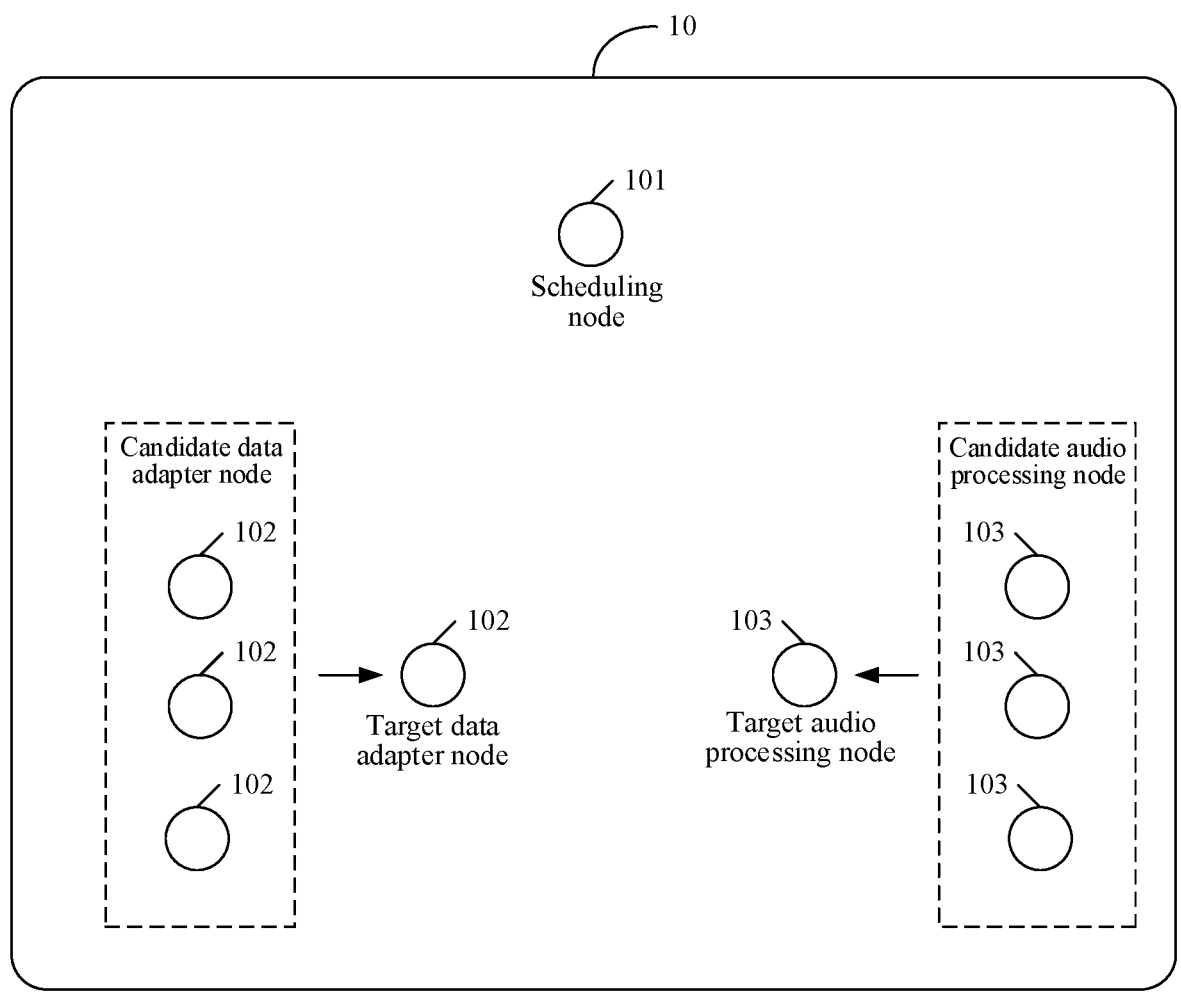
FIG. 6 shows the structure of a multi-user instant messaging system according to an embodiment of the present disclosure.

As shown in FIG. 6, in an embodiment, the system further includes at least two candidate audio processing nodes 103, and the scheduling node 101 is configured to select a candidate audio processing node 103 from the at least two candidate audio processing nodes 103 as a target audio processing node.

The candidate audio processing node is a node that is to be selected and can perform audio processing. The target audio processing node is a node that is determined and selected and configured to perform audio processing.

In this embodiment, the multi-user instant messaging system further includes at least two candidate audio processing nodes 103 in addition to the scheduling node 101 and the at least two candidate data adapter nodes 102. The candidate audio processing node 103 is configured as a candidate for audio processing. The scheduling node 101 is configured to select a candidate audio processing node from the at least two candidate audio processing nodes 103 as the target audio processing node. The scheduling node 101, at least two candidate data adapter nodes 102, and at least two candidate audio processing nodes 103 may be jointly considered as a server 10.

The selection and corresponding advantages of a target audio processing node are the same as the selection and corresponding advantages of a target data adapter node. Therefore, details are not described herein again. This embodiment is only an exemplary description, and does not limit the function and scope of use of the present disclosure.

In an embodiment, the target data adapter node is configured to separate corresponding first audio data streams from the first multimedia data streams.

The target audio processing node is configured to: perform audio mixing on the separated first audio data streams, and transmit the first audio data streams that have undergone the audio mixing to the target data adapter node, so that the target data adapter node obtains the second quantity of second multimedia data streams.

In this embodiment, in the multi-user instant messaging system including at least two candidate audio processing nodes, the selected target data adapter node is configured to: separate corresponding first audio data streams from the first multimedia data streams, where the selected target audio processing node performs audio mixing on the separated first audio data streams, and transmits the first audio data streams that have undergone the audio mixing to the target data adapter node, so that the target data adapter node obtains the second quantity of second multimedia data streams.

The advantage of this embodiment is that audio mixing is performed on the separated first audio data streams, so that a smaller quantity of second multimedia data streams can be obtained and the bandwidth requirements for recipient terminals can be reduced.

This embodiment is only an exemplary description, and does not limit the function and scope of use of the present disclosure.

In an embodiment, the target audio processing node is configured to remove, before performing audio mixing on the separated first audio data streams, if one first multimedia data stream originates from the recipient, the first audio data stream separated from the first multimedia data streams.

In this embodiment, in the multi-user instant messaging system including at least two candidate audio processing nodes, the selected target audio processing node, in addition to performing audio mixing on the separated first audio data streams and transmitting the first audio data streams that have undergone the audio mixing to the target data adapter node, before performing audio mixing on the separated first audio data streams, removes the first audio data stream that is separated from the first multimedia data streams and originates from a recipient, so that the second multimedia data streams received by the recipient do not include audio data of the recipient.

The advantage of this embodiment is that if one first multimedia data stream originates from the recipient, the first audio data stream separated from the first multimedia data streams is removed, so that the recipient is prevented from interference by the recipient's audio.

This embodiment is only an exemplary description, and does not limit the function and scope of use of the present disclosure.

Figure 7:
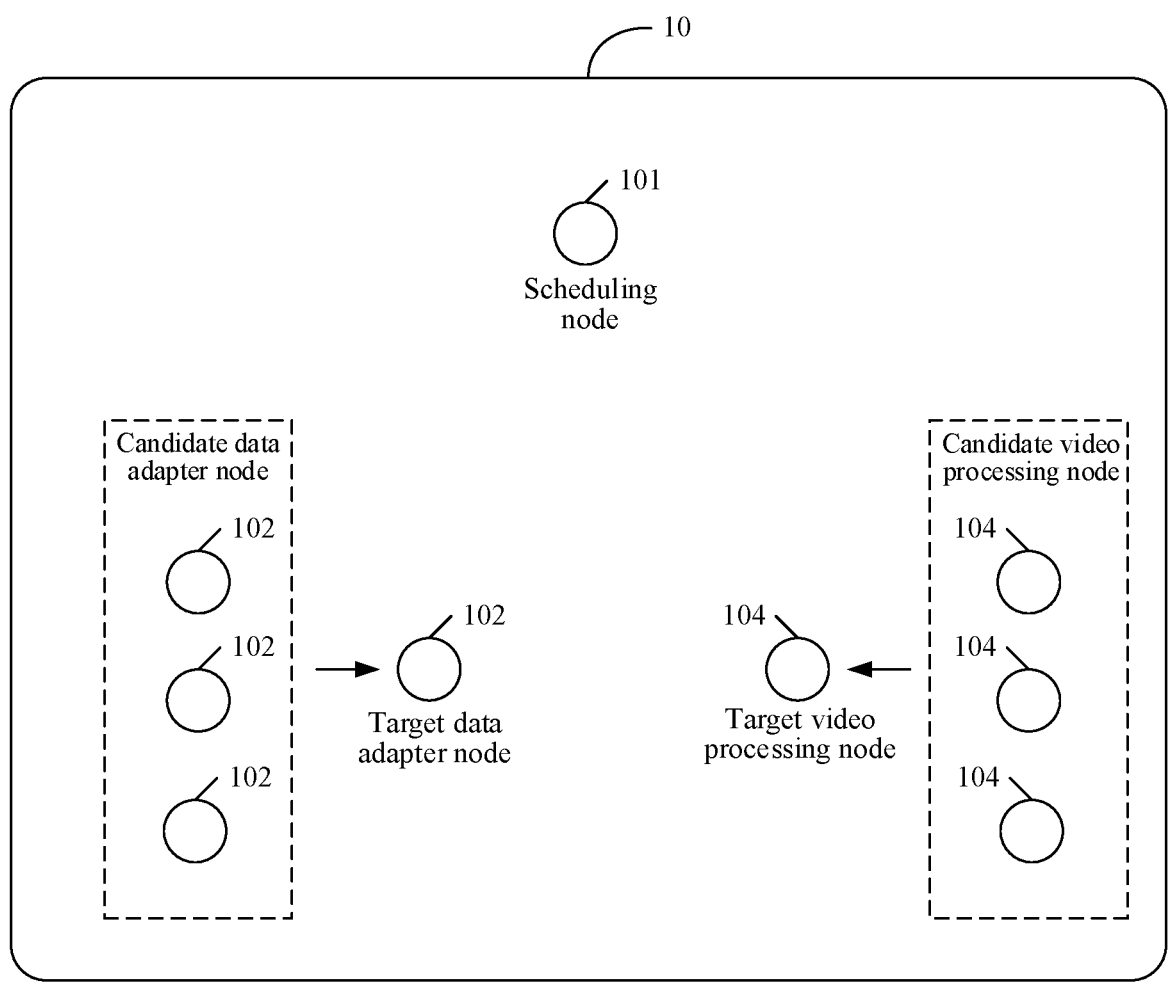
FIG. 7 shows the structure of a multi-user instant messaging system according to an embodiment of the present disclosure.

As shown in FIG. 7, in an embodiment, the system further includes at least two candidate video processing nodes 104, and the scheduling node 101 is configured to select a candidate video processing node 104 from the at least two candidate video processing nodes 104 as a target video processing node.

The candidate video processing node is a node that is to be selected and can perform video processing. The target video processing node is a node that is determined and selected and configured to perform video processing.

In this embodiment, the multi-user instant messaging system further includes at least two candidate video processing nodes 103 in addition to the scheduling node 101 and the at least two candidate data adapter nodes 102. The candidate video processing node 103 is configured as a candidate for video processing. The scheduling node 101 is configured to select a candidate video processing node from the at least two candidate video processing nodes 103 as the target video processing node. The scheduling node 101, at least two candidate data adapter nodes 102, and at least two candidate video processing nodes 103 may be jointly considered as a server 10.

The selection and corresponding advantages of a target video processing node are the same as the selection and corresponding advantages of a target data adapter node. Therefore, details are not described herein again. This embodiment is only an exemplary description, and does not limit the function and scope of use of the present disclosure.

In an embodiment, the target data adapter node is configured to separate corresponding first video data streams from the first multimedia data streams.

The target video processing node is configured to: perform video mixing on the separated first video data streams, and transmit the first video data streams that have undergone the video mixing to the target data adapter node, so that the target data adapter node obtains the second quantity of second multimedia data streams.

In this embodiment, in the multi-user instant messaging system including at least two candidate video processing nodes, the selected target data adapter node is configured to separate corresponding first video data streams from the first multimedia data streams. The selected target video processing node performs video mixing on the separated first video data streams, and transmits the first video data streams that have undergone the video mixing to the target data adapter node, so that the target data adapter node obtains the second quantity of second multimedia data streams.

The advantage of this embodiment is that video mixing is performed on the separated first video data streams, so that a smaller quantity of second multimedia data streams can be obtained and the bandwidth requirements for recipient terminals can be reduced.

This embodiment is only an exemplary description, and does not limit the function and scope of use of the present disclosure.

Figure 8:
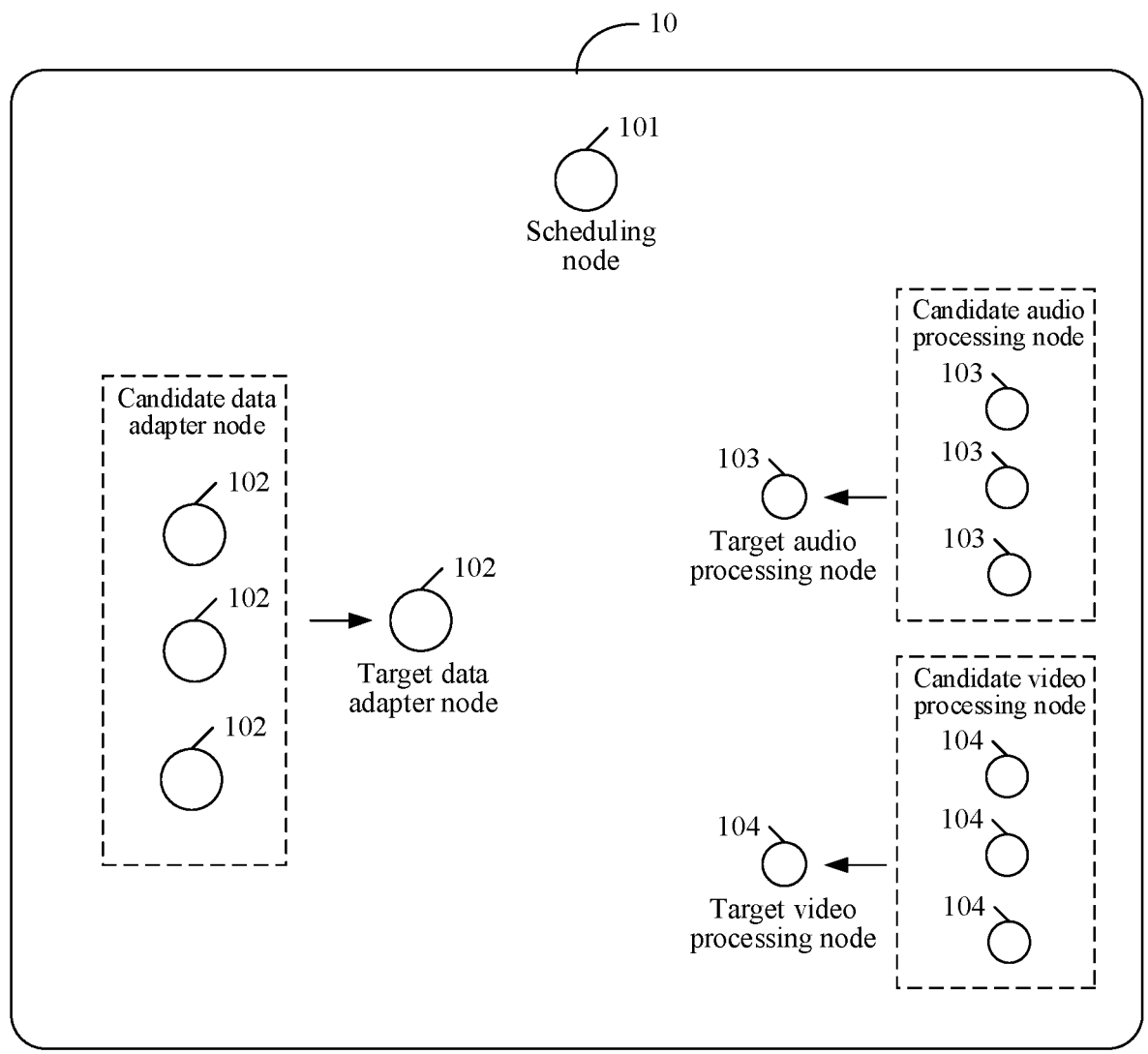
FIG. 8 shows the structure of a multi-user instant messaging system according to an embodiment of the present disclosure.

As shown in FIG. 8, in an embodiment, the system further includes at least two candidate audio processing nodes 103 and at least two candidate video processing nodes 104, and the scheduling node 101 is configured to:

select a candidate audio processing node 103 from the at least two candidate audio processing nodes 103 as the target audio processing node; and select a candidate video processing node 104 from the at least two candidate video processing nodes 104 as the target video processing node.

In this embodiment, when audio processing needs to be performed (for example, when the target data adapter node separates the first audio data streams and it is necessary to perform processing such as audio mixing and audio format conversion on the first audio data streams), the scheduling node selects the target audio processing node from the candidate audio processing nodes. When video processing needs to be performed (for example, when the target data adapter node separates the first video data streams and it is necessary to perform processing such as video mixing and video bitrate conversion on the first video data streams), the scheduling node selects the target video processing node from the candidate video processing nodes.

This embodiment is only an exemplary description, and does not limit the function and scope of use of the present disclosure.

In an embodiment, the target data adapter node is configured to:

separate corresponding first audio data streams from the first multimedia data streams; and separate corresponding first video data streams from the first multimedia data streams;

the target audio processing node is configured to: perform audio mixing on the separated first audio data streams, and transmit the first audio data streams that have undergone the audio mixing to the target data adapter node, so that the target data adapter node obtains the second quantity of second multimedia data streams;

the target video processing node is configured to: perform video mixing on the separated first video data streams, and transmit the first video data streams that have undergone the video mixing to the target data adapter node, so that the target data adapter node obtains the second quantity of second multimedia data streams; and the target data adapter node is configured to obtain the second quantity of second multimedia data streams based on the first audio data streams that have undergone the audio mixing and the first video data streams that have undergone the video mixing.

In this embodiment, the target data adapter node is responsible for separating corresponding first audio data streams and corresponding first video data streams from the first multimedia data streams. Next, target audio processing node is responsible for performing audio mixing on the separated first audio data streams and transmitting the first audio data streams that have undergone the audio mixing to the target data adapter node; and the target video processing node is responsible for performing video mixing on the separated first video data streams and transmitting the first video data streams that have undergone the video mixing to the target data adapter node. The target data adapter node is then responsible for obtaining the second quantity of second multimedia data streams based on the first audio data streams that have undergone the audio mixing and the first video data streams that have undergone the video mixing.

The advantage of this embodiment is that audio mixing is performed on the separated first audio data streams and video mixing is performed on the separated first video data streams, so that a smaller quantity of second multimedia data streams can be obtained and the bandwidth requirements for recipient terminals can be reduced.

This embodiment is only an exemplary description, and does not limit the function and scope of use of the present disclosure.

A complete implementation process of an embodiment of the present disclosure in a live streaming scenario is described below in detail with reference to FIG. 9 to FIG. 13.

Figure 9:
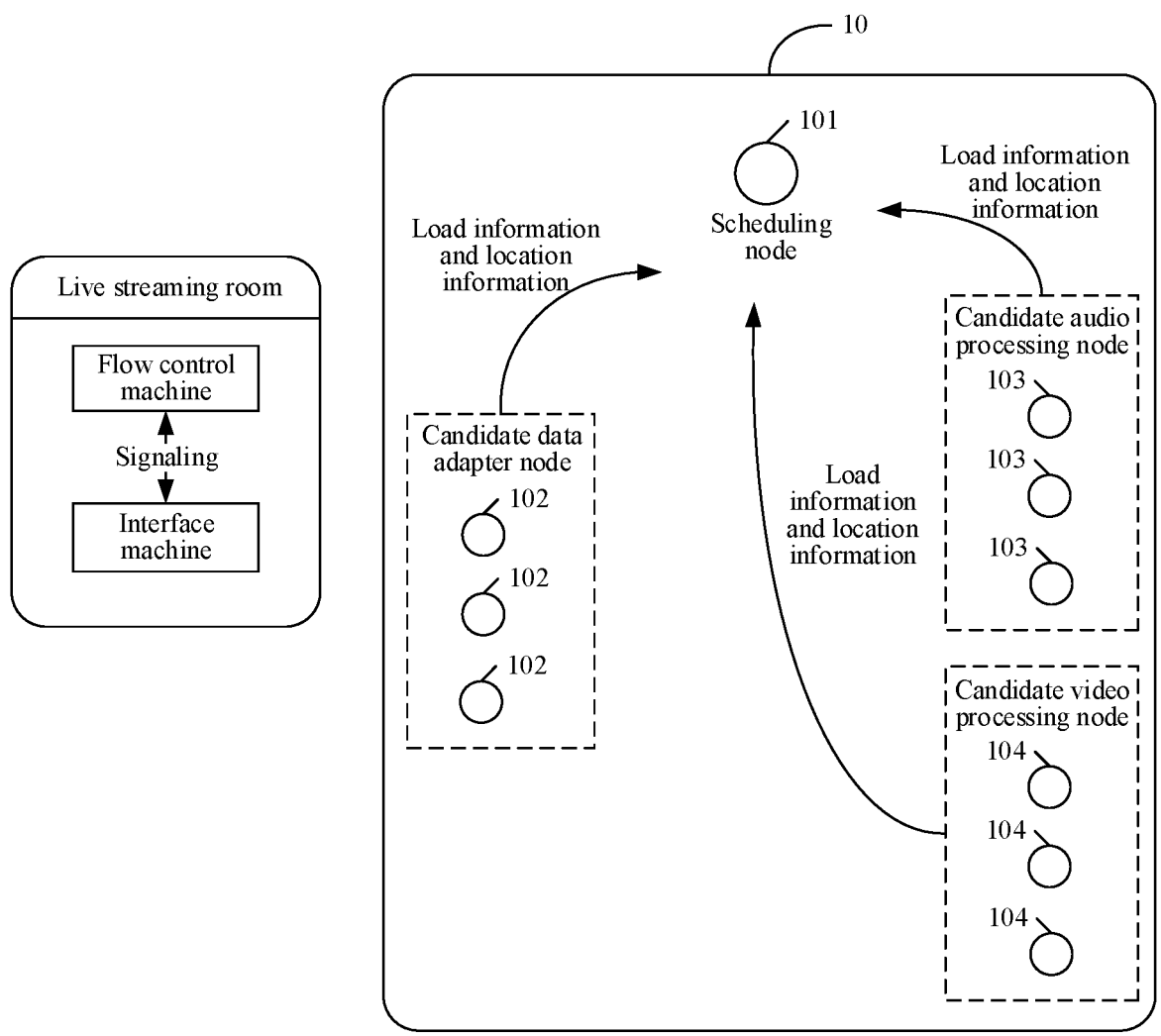
FIG. 9 shows an initial processing process of a multi-user instant messaging system in a live streaming scenario according to an embodiment of the present disclosure.

FIG. 9 shows an initial processing process of an embodiment of the present disclosure in a live streaming scenario. In an established live streaming room, there are two modules, namely, a flow control machine and an interface machine. The flow control machine is used for adjusting audio and video parameters in the live streaming room in real time during the live streaming. The interface machine is used for exchanging data with an external system (for example, a server 10) and performing signaling transmission with the flow control machine.

In this embodiment, a scheduling node in the server 10 periodically obtains load information and location information of candidate data adapter nodes, periodically obtains load information and location information of candidate audio processing nodes, and periodically obtains load information and location information of candidate video processing nodes. According to the obtained load information and location information, a target data adapter node, a target audio processing node, and a target video processing node are selected in the subsequent process.

This embodiment is only an exemplary description, and does not limit the function and scope of use of the present disclosure.

Figure 10:
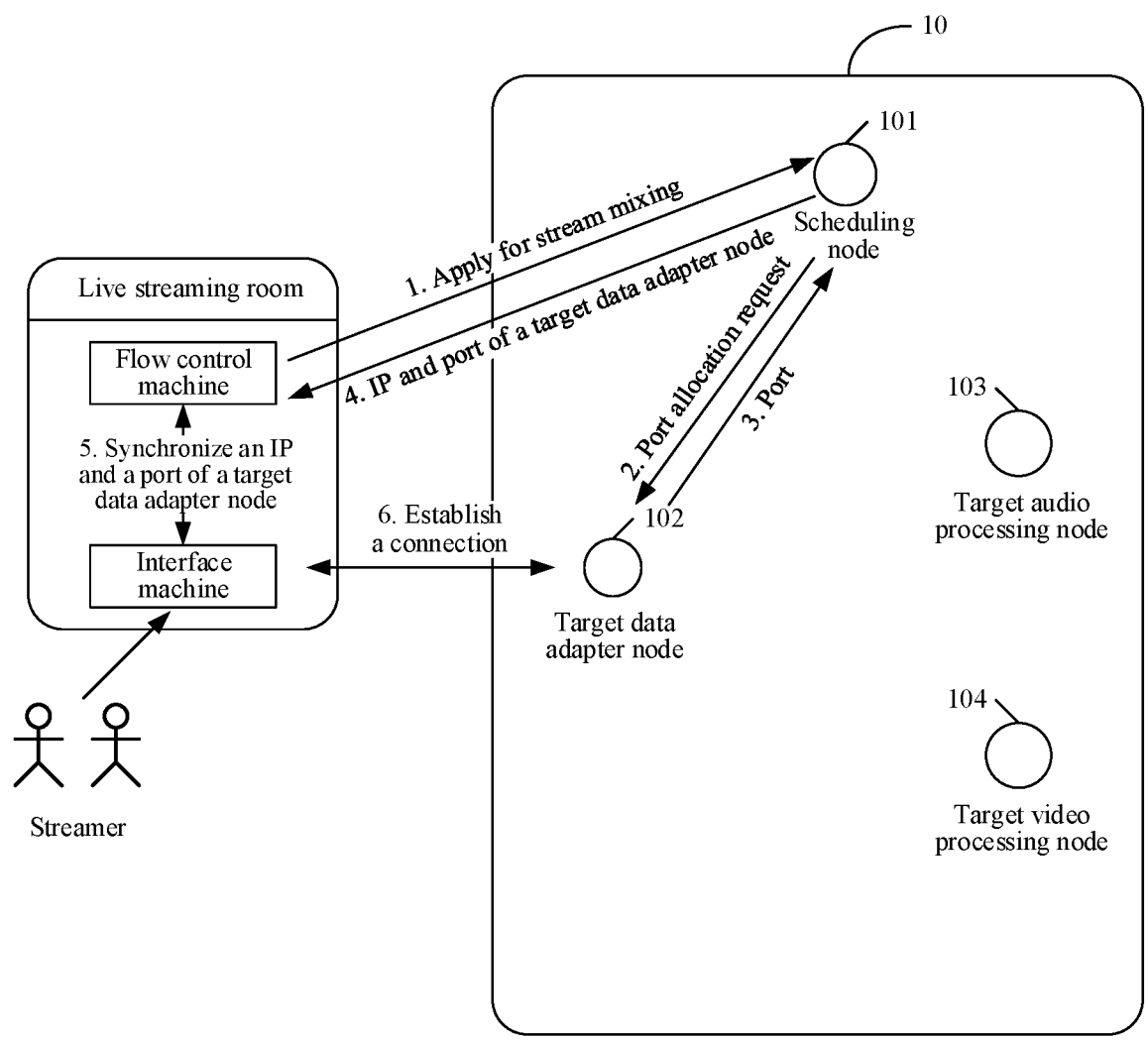
FIG. 10 shows a processing process of applying for stream mixing of a multi-user instant messaging system in a live streaming scenario according to an embodiment of the present disclosure.

FIG. 10 shows a processing process of applying for stream mixing in a live streaming scenario according to an embodiment of the present disclosure. The stream mixing shows a process of uploading, after a plurality of streamers join a live streaming room, multimedia data streams of the plurality of streamers to the server 10. Correspondingly, the applying for stream mixing is triggered when a plurality of streamers join a live streaming room and start live streaming.

For example, in this embodiment, step 1: A flow control machine applies to a scheduling node for stream mixing.

Step 2: The scheduling node selects, according to global load information and location information, a target data adapter node that processes the application for the stream mixing, and transmits a port allocation request to the target data adapter node.

Step 3: The target data adapter node establishes a session locally, allocates free ports, and transmits the allocated ports to the scheduling node.

Step 4: The scheduling node transmits an IP of the target data adapter node and a port of the target data adapter node to the flow control machine.

Step 5: The flow control machine synchronizes the IP of the target data adapter node and the port of the target data adapter node with the interface machine.

Step 6: The interface machine establishes a connection with the target data adapter node according to the received IP of the target data adapter node and the received port of the target data adapter node.

This embodiment is only an exemplary description, and does not limit the function and scope of use of the present disclosure.

Figure 11:
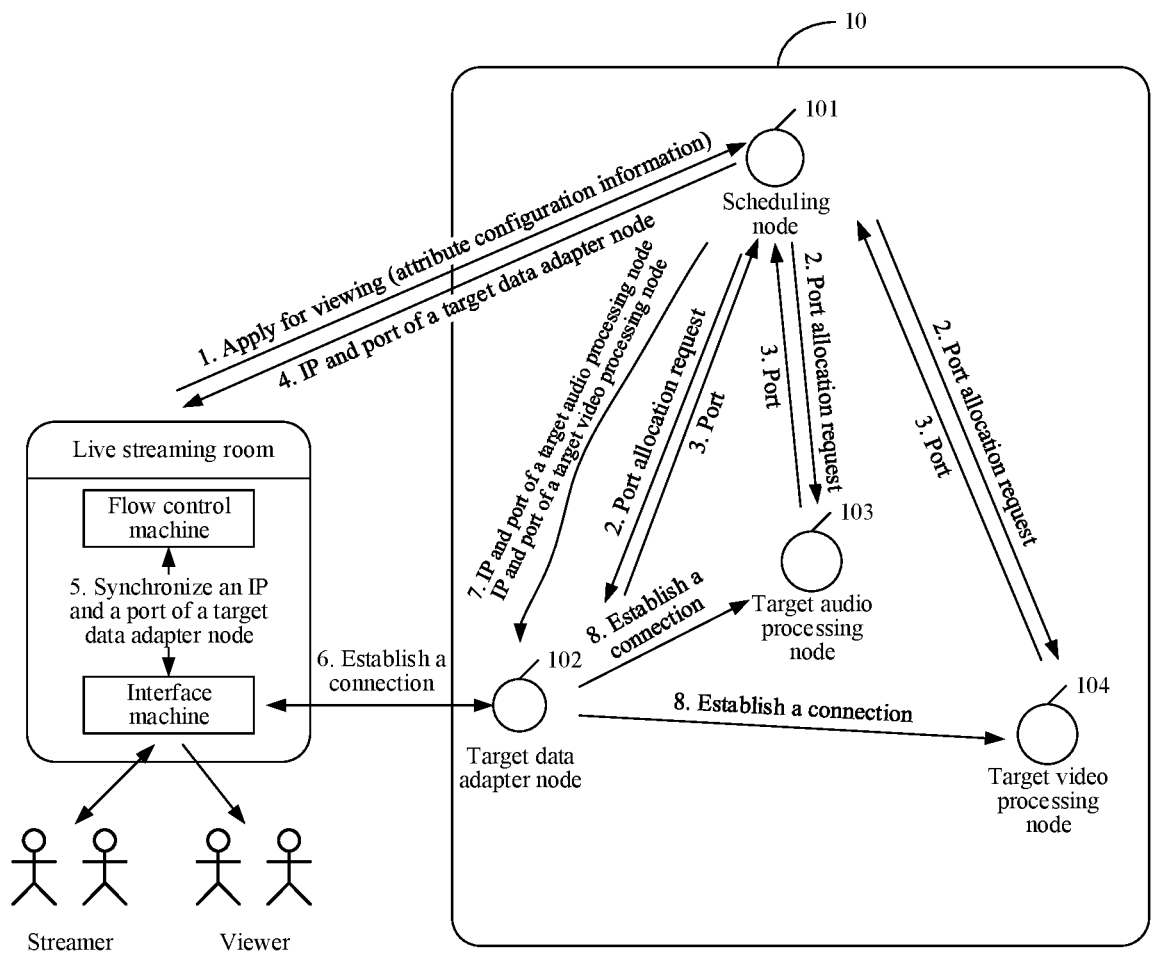
FIG. 11 shows a processing process of applying for viewing of a multi-user instant messaging system in a live streaming scenario according to an embodiment of the present disclosure.

FIG. 11 shows a processing process of applying for viewing in a live streaming scenario according to an embodiment of the present disclosure. A streamer may trigger application for viewing, and a viewer may trigger application for viewing.

For example, in this embodiment, step 1: A flow control machine transmits a request for viewing to a scheduling node, the request carrying attribute configuration information, for example, an audio encoding format, the number of channels, an audio bitrate, a video encoding format, a video resolution, a video bitrate, and a video display template.

Step 2: The scheduling node selects, according to global load information and location information, a target data adapter node, a target audio processing node, and a target video processing node that process the application for viewing, and transmits a port allocation request to the target data adapter node, the target audio processing node, and the target video processing node.

Step 3: The target data adapter node, the target audio processing node, and the target video processing node all establish sessions in the corresponding local (the target audio processing node and the target video processing node save attribute configuration information when the session is established in the corresponding local), allocate free ports, and transmits the allocated ports to the scheduling node. If a user applying for viewing already has a session applying for stream mixing on the target data adapter node, the target data adapter node may reuse the session applying for the stream mixing at this time. If a user applying for viewing requires both stream mixing and viewing (for example, a streamer in the live streaming room), for the user, the request for the stream mixing and the request for the viewing may be combined into the same request.

Step 4: The scheduling node transmits an IP of the target data adapter node and a port of the target data adapter node to the flow control machine.

Step 5: The flow control machine synchronizes the IP of the target data adapter node and the port of the target data adapter node with the interface machine.

Step 6: The interface machine establishes a connection with the target data adapter node according to the received IP of the target data adapter node and the received port of the target data adapter node.

Step 7: The scheduling node transmits an IP of the target audio processing node, a port of the target audio processing node, an IP of the target video processing node, and a port of the target video processing node to the target data adapter node.

Step 8: The target data adapter node separately establishes connections with the target audio processing node and the target video processing node according to the received IP of the target audio processing node, the received port of the target audio processing node, the received IP of the target video processing node, and the received port of the target video processing node.

In this embodiment, steps 4, 5, and 6 may be performed in parallel with steps 7 and 8.

This embodiment is only an exemplary description, and does not limit the function and scope of use of the present disclosure.

Figure 12:
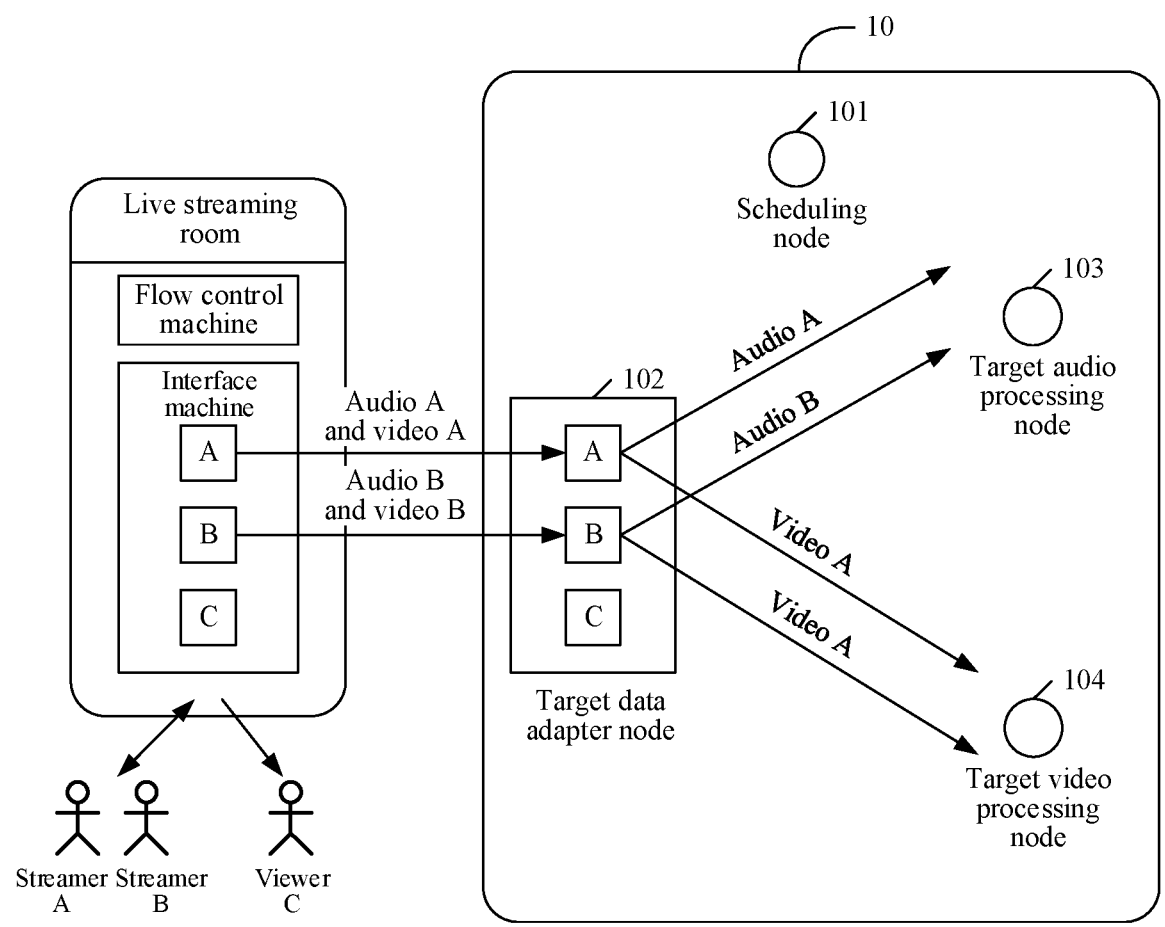
FIG. 12 shows a processing process of uplink data of a multi-user instant messaging system in a live streaming scenario according to an embodiment of the present disclosure.

FIG. 12 shows a processing process of uplink data in a live streaming scenario according to an embodiment of the present disclosure. In this embodiment, there are three users, namely, a streamer A, a streamer B, and a viewer C. Only the streamer A and the streamer B can trigger the processing process of uplink data.

The streamer A and the streamer B upload the corresponding multimedia data streams during the live streaming. For example, the streamer A transmits the streamer A's audio and video data streams to a target data adapter node. The streamer B transmits the streamer B's audio and video data streams to the target data adapter node.

After the target data adapter node receives the multimedia data streams transmitted by the streamer A and the streamer B, for the streamer A, the audio and the video of the streamer A are separated. For the streamer B, the audio and the video of the streamer B are separated. The audio of the streamer A and the audio of the streamer B are transmitted to the target audio processing node for processing (the target audio processing node correspondingly processes the audio according to the attribute configuration information). The video of the streamer A and the video of the streamer B are transmitted to the target video processing node for processing (the target video processing node correspondingly processes the videos according to the attribute configuration information).

This embodiment is only an exemplary description, and does not limit the function and scope of use of the present disclosure.

Figure 13:
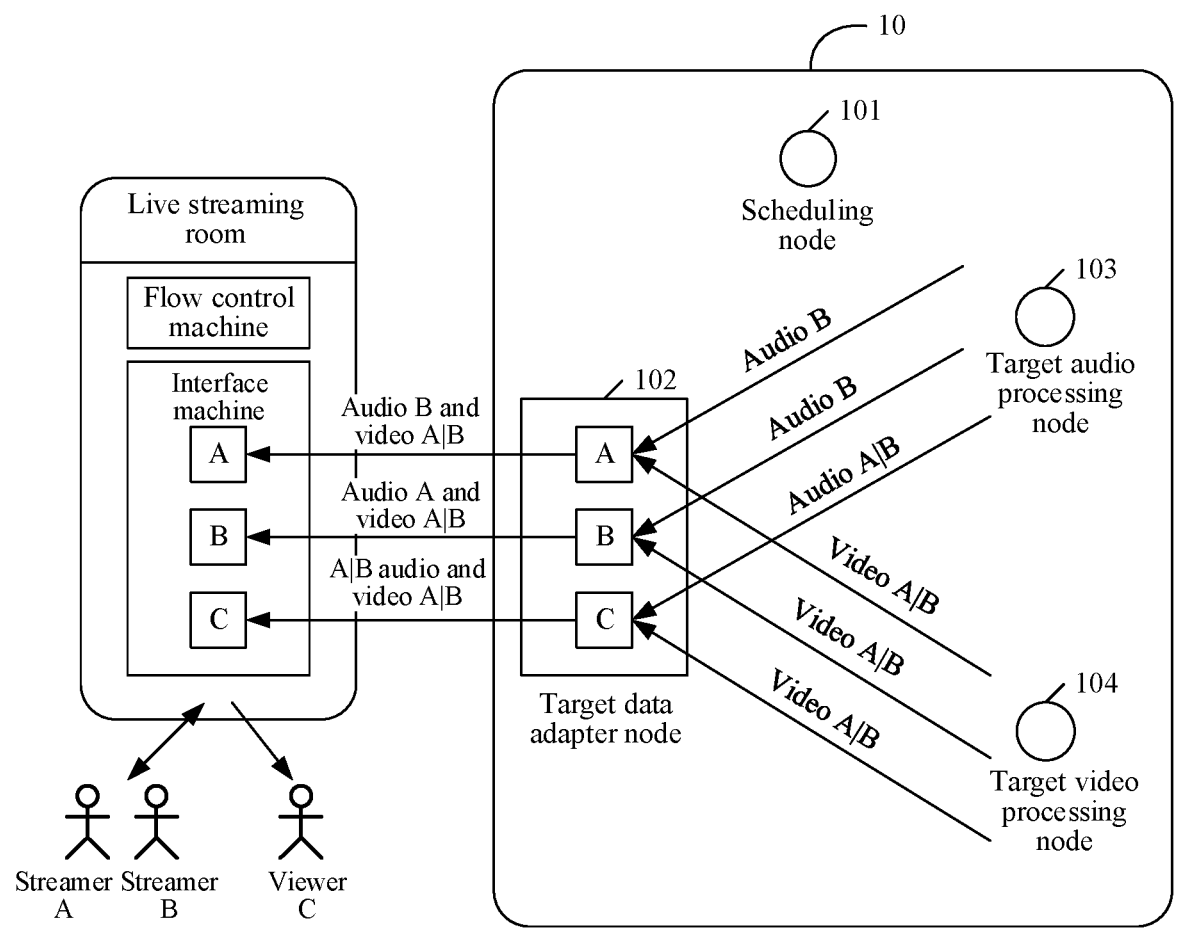
FIG. 13 shows a processing process of downlink data of a multi-user instant messaging system in a live streaming scenario according to an embodiment of the present disclosure.

FIG. 13 shows a processing process of downlink data in a live streaming scenario according to an embodiment of the present disclosure. In this embodiment, there are three users, namely, a streamer A, a streamer B, and a viewer C. Any user can trigger the processing process of the downlink data.

During the live streaming, after application for viewing of any user is granted, a corresponding processing process of downlink data is triggered.

The streamer A only needs to listen to audio of the streamer B and watch the common video of the streamer A and the streamer B (a video display layout may be customized). The target audio processing node selects an audio channel (removes the audio of A), performs corresponding processing according to the attribute configuration information, and transmits audio of the streamer B to a target data adapter node. The target data adapter node transmits the audio of the streamer B to an interface machine according to a corresponding data transmission protocol, and the interface machine then forwards the audio to the streamer A. The target video processing node performs video mixing on the video of the streamer A and the video of the streamer B, performs corresponding processing according to the attribute configuration information, and transmits the result to the target data adapter node. The target data adapter node divides video frames into frames of a size less than the maximum transmission unit size of the network and encapsulates the frames according to a corresponding data transmission protocol, and transmits the frames to the interface machine, and the interface machine then forwards the frames to the streamer A.

The streamer B only needs to listen to audio of the streamer A and watch the common video of the streamer A and the streamer B (a video display layout may be customized). The target audio processing node selects an audio channel (removes the audio of the streamer B), performs corresponding processing according to the attribute configuration information, and transmits audio of the streamer A to a target data adapter node. The target data adapter node transmits the audio of the streamer A to an interface machine according to a corresponding data transmission protocol, and interface machine then forwards the audio to the streamer B. The target video processing node performs video mixing on the video of the streamer A and the video of the streamer B, performs corresponding processing according to the attribute configuration information, and transmits the result to the target data adapter node. The target data adapter node divides video frames into frames of a size less than the maximum transmission unit size of the network and encapsulates the frames according to a corresponding data transmission protocol, and transmits the frames to the interface machine, and the interface machine then forwards the frames to the streamer B.

The viewer C needs to listen to audio of the streamer A and the streamer B and watch the common video of the streamer A and the streamer B (a video display layout may be customized). The target audio processing node mixes the audio of the streamer A and the audio of the streamer B into one piece of audio, performs corresponding processing according to the attribute configuration information, and transmits the result to the target data adapter node. The target data adapter node then transmits the result to the interface machine, and the interface machine forwards the result to the viewer C. The target video processing node performs video mixing on the video of the streamer A and the video of the streamer B, performs corresponding processing according to the attribute configuration information, and transmits the result to the target data adapter node. The target data adapter node divides video frames into frames of a size less than the maximum transmission unit size of the network and encapsulates the frames according to a corresponding data transmission protocol, and transmits the frames to the interface machine, and the interface machine then forwards the frames to the viewer C.

This embodiment is only an exemplary description, and does not limit the function and scope of use of the present disclosure.

Figure 14:
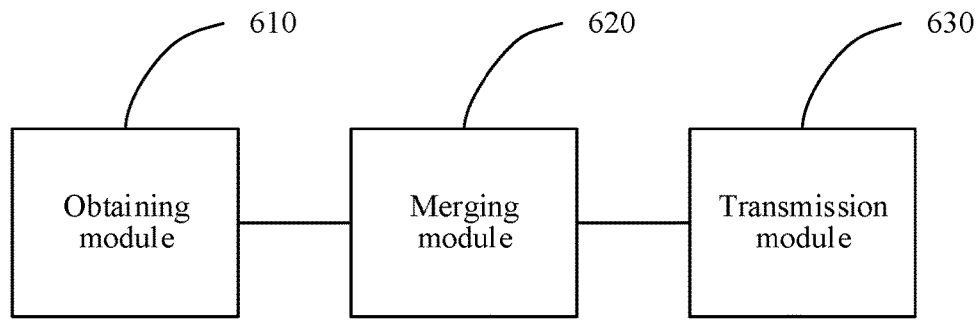
FIG. 14 is a block diagram of a multi-user instant messaging apparatus according to an embodiment of the present disclosure.

According to an embodiment of the present disclosure, as shown in FIG. 14, a multi-user instant messaging apparatus is further provided, the apparatus including:

an obtaining module 610, configured to obtain a first quantity of first multimedia data streams;

a merging module 620, configured to merge the first quantity of first multimedia data streams into a second quantity of second multimedia data streams, the second quantity being less than the first quantity; and a transmission module 630, configured to transmit the second quantity of second multimedia data streams to a recipient, so that the recipient terminal presents the corresponding second multimedia data streams.

In an exemplary embodiment of the present disclosure, the merging module 620 is configured to:

convert, based on attribute configuration information, the first quantity of first multimedia data streams into the first quantity of first multimedia data streams matching the attribute configuration information; and merge the first quantity of first multimedia data streams matching the attribute configuration information into the second quantity of second multimedia data streams matching the attribute configuration information, where before the first quantity of first multimedia data streams are merged into a second quantity of second multimedia data streams, the attribute configuration information preset by the recipient for multimedia playback is obtained.

In an exemplary embodiment of the present disclosure, the merging module 620 is configured to:

separate corresponding first audio data streams from the first multimedia data streams; and perform audio mixing on the separated first audio data streams to obtain the second quantity of second multimedia data streams.

In an exemplary embodiment of the present disclosure, the merging module 620 is configured to remove, if one first multimedia data stream originates from the recipient, the first audio data stream separated from the first multimedia data streams.

That is, the merging module 620 is configured to remove, for a target multimedia data streams, if the target multimedia data stream originates from the recipient, the first audio data stream separated from the target multimedia data stream, the target multimedia data stream being any one of the first quantity of first multimedia data streams.

In an exemplary embodiment of the present disclosure, the merging module 620 is configured to:

separate corresponding first video data streams from the first multimedia data streams; and perform video mixing on the separated first video data streams to obtain the second quantity of second multimedia data streams.

In an exemplary embodiment of the present disclosure, the merging module 620 is configured to:

separate corresponding first audio data streams from the first multimedia data streams;

separate corresponding first video data streams from the first multimedia data streams;

perform audio mixing on the separated first audio data streams;

perform video mixing on the separated first video data streams; and obtain the second quantity of second multimedia data streams based on the first audio data streams that have undergone the audio mixing and the first video data streams that have undergone the video mixing.

A multi-user instant messaging electronic device 70 is described below with reference to FIG. 15 according to an embodiment of the present disclosure. The multi-user instant messaging electronic device 70 shown in FIG. 15 is only an example, and does not impose any limitation on the functions and scope of use of the embodiments of the present disclosure.

Figure 15:
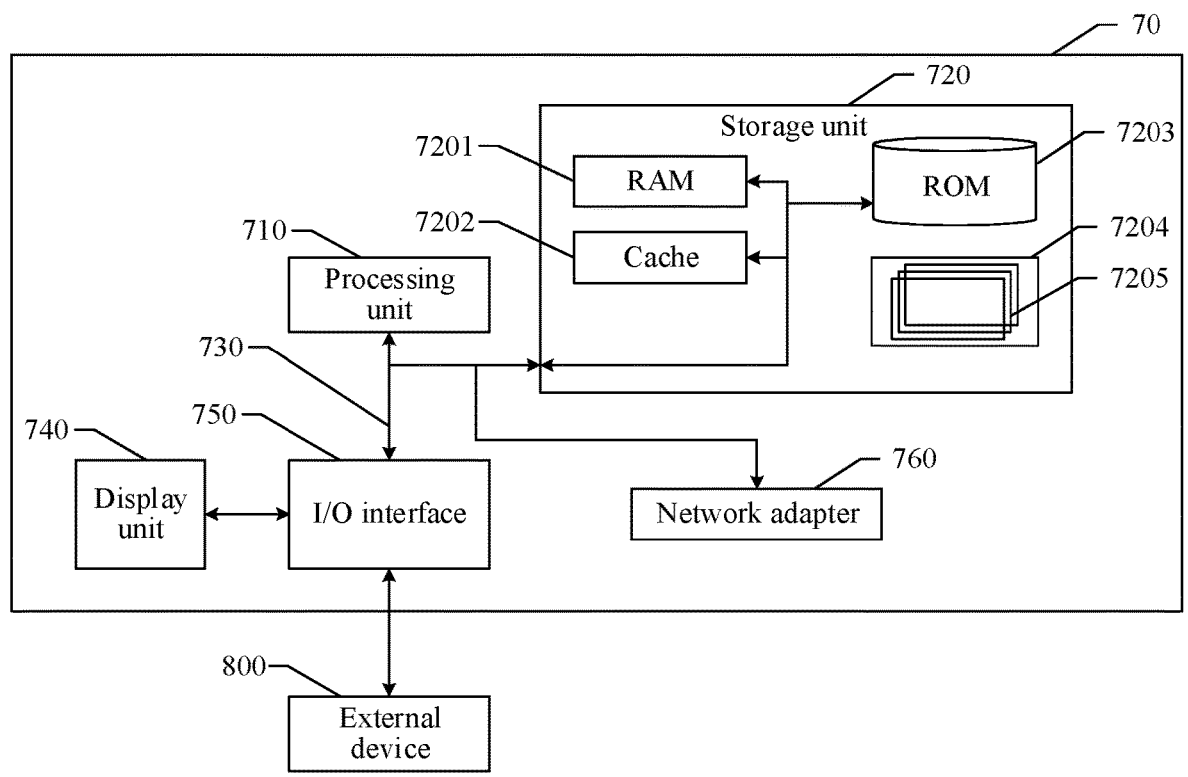
FIG. 15 is a hardware diagram of a multi-user instant messaging electronic device according to an embodiment of the present disclosure.

As shown in FIG. 15, the multi-user instant messaging electronic device 70 is represented in the form of a general-purpose computing device. Components of the multi-user instant messaging electronic device 70 may include, but are not limited to, at least one processing unit 710, at least one storage unit 720, and a bus 730 connected to different system components (including the storage unit 720 and the processing unit 710).

The storage unit stores program code, and the program code may be executed by the processing unit 710, so that the processing unit 710 performs the steps according to various exemplary implementations of the present disclosure described in the descriptions of the foregoing exemplary methods of the specification. For example, the processing unit 710 may perform the steps shown in FIG. 3.

The storage unit 720 may include a readable medium in the form of a volatile storage unit, for example, a random access memory (RAM) 7201 and/or a cache storage unit 7202, and may further include a read-only memory (ROM) 7203.

The storage unit 720 may further include a program/utility 7204 having a group of (at least one) program modules 7205. Such a program module 7205 includes, but is not limited to, an operating system, one or more application programs, other program modules, and program data. Each or a combination of these examples may include implementation of a network environment.

The bus 730 may represent one or more of several types of bus structures, including a storage unit bus or a storage unit controller, a peripheral bus, an accelerated graphics port, a processing unit, or a local bus using any bus structure in a plurality of types of bus structures.

The multi-user instant messaging electronic device 70 may alternatively communicate with one or more external devices 800 (for example, a keyboard, a pointing device, and a Bluetooth device), may alternatively communicate with a plurality of devices that enable a user to interact with the multi-user instant messaging electronic device 70, and/or communicate with any device (for example, router or a modem) that enables the multi-user instant messaging electronic device 70 to communicate with one or more other computing devices. Such communication may be performed through an input/output (I/O) interface 750. The I/O interface 750 is connected to a display unit 740. In addition, the multi-user instant messaging electronic device 70 may further communicate with one or more networks such as a local area network (LAN), a wide area network (WAN), and/or a public network (for example, the Internet) through a network adapter 760. As shown in the figure, the network adapter 760 communicates with other modules in the multi-user instant messaging electronic device 70 through the bus 730. It is to be understood that although not shown in the figure, other hardware and/or software modules may be used in combination with the multi-user instant messaging electronic device 70, including, but not limited to microcode, a device driver, a redundancy processing unit, an external disk drive array, a RAID system, a tape drive, a data backup and storage system, or the like.

Through descriptions of the foregoing implementations, it is easy for a person skilled in the art to understand that the exemplary implementations described herein can be implemented by software or by combining software with necessary hardware. Therefore, the technical solutions of the implementations of the present disclosure may be implemented in the form of a software product. The software product may be stored in a non-volatile storage medium (which may be a compact disc read-only memory (CD-ROM), a USB flash drive, a removable hard disk, or the like) or in a network and includes several instructions for instructing a computer device (which may be a personal computer, a server, a terminal device, a network device, or the like) to perform the methods described in the implementations of the present disclosure.

In an exemplary embodiment of the present disclosure, a computer-readable storage medium is further provided, storing computer-readable instructions, the computer-readable instructions, when executed by a processor of a computer, causing the computer to perform the methods described in the foregoing method embodiments.

According to an embodiment of the present disclosure, a program product for implementing the methods in the foregoing method embodiments is further provided. The program product may use a portable CD-ROM and include program code, and may be run on a terminal device such as a personal computer. However, the program product of the present disclosure is not limited thereto. In this file, the readable storage medium may be any tangible medium including or storing a program, and the program may be used by or in combination with an instruction execution system, apparatus, or device.

The program product may be any combination of one or more readable media. The readable medium may be a readable signal medium or a readable storage medium. The readable storage medium may be, for example, but not limited to, an electric, magnetic, optical, electromagnetic, infrared, or semi-conductive system, apparatus, or device, or any combination thereof. More specific examples of the readable storage medium (a non-exhaustive list) include: an electrical connection having one or more wires, a portable disk, a hard disk, a RAM, a ROM, an erasable programmable ROM (EPROM or a flash memory), an optical fiber, a CD-ROM, an optical storage device, a magnetic storage device, or any appropriate combination thereof.

The computer readable storage medium may be a data signal included in a baseband or transmitted as a part of a carrier, which carries a readable program code. The propagated data signal may be in a plurality of forms, including, but not limited to, an electromagnetic signal, an optical signal, or any appropriate combination thereof. The readable signal medium may alternatively be any readable medium other than the readable storage medium. The readable medium may be configured to transmit, propagate, or transmit a program configured to be used by or in combination with an instruction execution system, apparatus, or device.

The program code included in the readable medium may be transmitted by using any suitable medium, including but not limited to, via wireless transmission, a wire, a cable, radio frequency (RF) or the like, or any suitable combination of thereof.

A program code for performing the operation of the present disclosure may be written by using any combination of one or more programming languages. The programming language includes an object-oriented programming language such as Java, C++, and a conventional procedural programming language such as a "C" Language or a similar programming language. The program code may be completely executed on a user computing device, partially executed on a user device, executed as an independent software package, partially executed on a user computing device and partially executed on a remote computing device, or completely executed on a remote computing device or server. In case of the remote computing device, the remote computing device may be connected to the computing device of a user by using any network including a LAN or a WAN, or may be connected to an external computing device (for example, connected to the external computing device through the Internet by using an Internet service provider).

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. Although several modules or units of a device for action execution are mentioned in the foregoing detailed descriptions, the division is not mandatory. Actually, according to the implementations of the present disclosure, features and functions of the two or more modules or units described above may be embodied in one module or unit. Conversely, the features and functions of one module or unit described above may be further divided into a plurality of modules or units to be embodied.

In addition, although the steps of the method in the present disclosure are described in the accompanying drawings in a specific sequence, it is not required or does not imply that these steps need to be performed according to the specific sequence, or all shown steps need to be performed to achieve an expected result. Additionally or alternatively, some steps may be omitted, a plurality of steps are combined into one step, and/or one step is decomposed into a plurality of steps for execution, and the like.

Through the description of the foregoing embodiments, a person of ordinary skill in the art can easily understand that the exemplary implementations described herein may be implemented by software, or may be implemented by combining software with necessary hardware. Therefore, the technical solutions of the implementations of the present disclosure may be implemented in the form of a software product. The software product may be stored in a non-volatile storage medium (which may be a CD-ROM, a USB flash drive, a removable hard disk, or the like) and includes several instructions for instructing a computer device (which may be a personal computer, a server, a mobile terminal, a network device, or the like) to execute the methods described in the implementations of the present disclosure.

After considering the specification and practicing the present disclosure, a person skilled in the technology would easily conceive of other implementations of the present disclosure. This application is intended to cover any variation, use, or adaptive change of the present disclosure. These variations, uses, or adaptive changes follow the general principles of the present disclosure and include common general knowledge or common technical means, which are not disclosed in the present disclosure, in the technology. The specification and the embodiments are merely for an illustration purpose, and the true scope and spirit of the present disclosure are subject to the claims.

What is claimed is:

1. A multi-user instant messaging method, the method being performed by a server having a memory and a processor configured to execute computer-readable instructions stored in the memory, the method comprising:
    collecting operating status information of a plurality of candidate nodes physically distributed at different geographic locations;
    selecting one or more target nodes from the plurality of candidate nodes based on the operating status information corresponding to each candidate node; and
    streaming multimedia content to a recipient terminal by the one or more target nodes, including:
        obtaining a first quantity of first multimedia data streams;
        for each of the first quantity of first multimedia data streams, separating a respective first audio data stream and a respective first video data stream from the respective first multimedia data stream;

performing audio mixing on a plurality of separated first audio data streams of the first quantity of first multimedia data streams to obtain one or more mixed audio data streams;

performing video mixing on a plurality of separated first video data streams of the first quantity of first multimedia data streams to obtain one or more mixed video data streams;

merging the one or more mixed audio data streams and the one or more mixed video data streams into a second quantity of second multimedia data streams, the second quantity being less than the first quantity; and transmitting the second quantity of second multimedia data streams to the recipient terminal, wherein the recipient terminal presents the corresponding second multimedia data streams;

wherein the plurality of candidate nodes includes a plurality of candidate data adapters;

wherein the operating status information of the candidate data adapter nodes is organized into data blocks according to a blockchain scheme, and the operating status information of each candidate data adapter node includes load information of the respective candidate data adapter node; and wherein the method further includes determining a status score indicating performance of each candidate data adapter node based on the operating status information, wherein the one or more target nodes are selected based on the status scores of the candidate data adapter nodes.

2. The method according to claim 1, wherein the merging the first quantity of first multimedia data streams into a second quantity of second multimedia data streams comprises:

converting, based on attribute configuration information, the first quantity of first multimedia data streams into the first quantity of first multimedia data streams matching the attribute configuration information, the attribute configuration information being information used for indicating a presentation attribute of a corresponding multimedia data stream and including the predefined simultaneous video display template; and merging the first quantity of first multimedia data streams matching the attribute configuration information into the second quantity of second multimedia data streams matching the attribute configuration information.

3. The method according to claim 2, wherein before the merging the first quantity of first multimedia data streams into a second quantity of second multimedia data streams, the method comprises:

obtaining the attribute configuration information preset by the recipient terminal for multimedia playback.

4. The method according to claim 1, wherein before the performing audio mixing on the plurality of separated first audio data streams, the method further comprises:

removing, in accordance with a determination that a target multimedia data stream originates from the recipient, the first audio data streams separated from the target multimedia data stream, the target multimedia data stream being any one of the first quantity of first multimedia data streams.

5. The method according to claim 1, wherein the merging the first quantity of first multimedia data streams into a second quantity of second multimedia data streams comprises:

separating corresponding first video data streams from the first multimedia data streams; and performing video mixing on the plurality of separated first video data streams to obtain the second quantity of second multimedia data streams.

6. A server for performing multi-user instant messaging, comprising:

a memory, storing computer-readable instructions; and a processor, configured to execute the computer-readable instructions stored in the memory to perform a plurality of operations including:

collecting operating status information of a plurality of candidate nodes physically distributed at different geographic locations;

selecting one or more target nodes from the plurality of candidate nodes based on the operating status information corresponding to each candidate node; and streaming multimedia content to a recipient terminal by the one or more target nodes, including:

obtaining a first quantity of first multimedia data streams;

for each of the first quantity of first multimedia data streams, separating a respective first audio data stream and a respective first video data stream from the respective first multimedia data stream;

performing audio mixing on a plurality of separated first audio data streams of the first quantity of first multimedia data streams to obtained obtain one or more mixed audio data streams;

performing video mixing on a plurality of separated first video data streams of the first quantity of first multimedia data streams to obtain one or more mixed video data streams;

merging the first quantity of first multimedia data streams into the one or more mixed audio data streams and the one or more mixed video data streams into a second quantity of second multimedia data streams, the second quantity being less than the first quantity; and transmitting the second quantity of second multimedia data streams to the recipient terminal, wherein the recipient terminal presents the corresponding second multimedia data streams;

wherein the plurality of candidate nodes includes a plurality of candidate data adapters;

wherein the operating status information of the candidate data adapter nodes is organized into data blocks according to a blockchain scheme, and the operating status information of each candidate data adapter node includes load information of the respective candidate data adapter node; and wherein the plurality of operations further includes determining a status score indicating performance of each candidate data adapter node based on the operating status information, wherein the one or more target nodes are selected based on the status scores of the candidate data adapter nodes.

7. The server according to claim 6, wherein the merging the first quantity of first multimedia data streams into a second quantity of second multimedia data streams comprises:

converting, based on attribute configuration information, the first quantity of first multimedia data streams into the first quantity of first multimedia data streams matching the attribute configuration information, the attribute configuration information being information used for indicating a presentation attribute of a corresponding multimedia data stream and including the predefined simultaneous video display template; and
merging the first quantity of first multimedia data streams matching the attribute configuration information into the second quantity of second multimedia data streams matching the attribute configuration information.

8. The server according to claim 7, wherein before the merging the first quantity of first multimedia data streams into a second quantity of second multimedia data streams, the plurality of operations comprise:
obtaining the attribute configuration information preset by the recipient terminal for multimedia playback.

9. The server according to claim 7, wherein before the performing audio mixing on the plurality of separated first audio data streams, the plurality of operations comprise:
removing, in accordance with a determination that a target multimedia data stream originates from the recipient, the first audio data streams separated from the target multimedia data stream, the target multimedia data stream being any one of the first quantity of first multimedia data streams.

10. The server according to claim 6, wherein the merging the first quantity of first multimedia data streams into a second quantity of second multimedia data streams comprises:
separating corresponding first video data streams from the first multimedia data streams; and
performing video mixing on the plurality of separated first video data streams to obtain the second quantity of second multimedia data streams.

11. A non-transitory computer-readable storage medium, storing computer-readable instructions for performing multi-user instant messaging, the computer- readable instructions, when executed by a processor of a server, implementing a plurality of operations including:
collecting operating status information of a plurality of candidate nodes physically distributed at different geographic locations;
selecting one or more target nodes from the plurality of candidate nodes based on the operating status information corresponding to each candidate node; and
streaming multimedia content to a recipient terminal by the one or more target nodes, including:
obtaining a first quantity of first multimedia data streams;
for each of the first quantity of first multimedia data streams, separating a respective first audio data stream and a respective first video data stream from the respective first multimedia data stream;
performing audio mixing on a plurality of separated first audio data streams of the first quantity of first multimedia data streams to obtain one or more mixed audio data streams;
performing video mixing on a plurality of separated first video data streams of the first quantity of first multimedia data streams to obtain one or more mixed video data streams;
merging the first quantity of first multimedia data streams into the one or more mixed audio data streams and the one or more mixed video data streams into a second quantity of second multimedia data streams, the second quantity being less than the first quantity; and
transmitting the second quantity of second multimedia data streams to the recipient terminal, wherein the recipient terminal presents the corresponding second multimedia data streams;
wherein the plurality of candidate nodes includes a plurality of candidate data adapters;
wherein the operating status information of the candidate data adapter nodes is organized into data blocks according to a blockchain scheme, and the operating status information of each candidate data adapter node includes load information of the respective candidate data adapter node; and
wherein the plurality of operations further includes determining a status score indicating performance of each candidate data adapter node based on the operating status information, wherein the one or more target nodes are selected based on the status scores of the candidate data adapter nodes.

12. The non-transitory computer-readable storage medium according to claim 11, wherein the merging the first quantity of first multimedia data streams into a second quantity of second multimedia data streams comprises:
converting, based on attribute configuration information, the first quantity of first multimedia data streams into the first quantity of first multimedia data streams matching the attribute configuration information, the attribute configuration information being information used for indicating a presentation attribute of a corresponding multimedia data stream and including the predefined simultaneous video display template; and
merging the first quantity of first multimedia data streams matching the attribute configuration information into the second quantity of second multimedia data streams matching the attribute configuration information.

13. The non-transitory computer-readable storage medium according to claim 12, wherein before the merging the first quantity of first multimedia data streams into a second quantity of second multimedia data streams, the plurality of operations comprise:
obtaining the attribute configuration information preset by the recipient terminal for multimedia playback.

14. The non-transitory computer-readable storage medium according to claim 11, wherein the merging the first quantity of first multimedia data streams into a second quantity of second multimedia data streams comprises:
separating corresponding first video data streams from the first multimedia data streams; and
performing video mixing on the plurality of separated first video data streams to obtain the second quantity of second multimedia data streams.

15. The server of claim 6, wherein:
the plurality of candidate nodes includes a plurality of candidate adapter data nodes, a plurality of audio data processing nodes and a plurality of video data processing nodes; and
the one or more target nodes include a target adapter data node, a target audio data processing node, and a target video data processing node;
the target adapter data node is configured to separate the first multimedia data streams and generate the second multimedia data streams;
the target audio data processing node is configured to perform audio mixing; and
the target video data processing node is configured to perform video mixing.

16. The method of claim 1, wherein: each mixed audio data stream combines a subset of separated first audio data streams and allows a recipient to play the subset of separated first audio data streams collectively via the same stream of the respective mixed audio data stream.

17. The method of claim 1, wherein video mixing is performed based on a predefined simultaneous video display template, and each mixed video data stream combines a subset of separated first video data streams, the predefined simultaneous video display template defining a format in which play each of the subset of separated first video data streams is organized to be displayed concurrently on a screen via the same stream of the respective mixed video data stream.

18. The server of claim 6, wherein: each mixed audio data stream combines a subset of separated first audio data streams and allows a recipient to play the subset of separated first audio data streams collectively via the same stream of the respective mixed audio data stream.

19. The server of claim 6, wherein video mixing is performed based on a predefined simultaneous video display template, and each mixed video data stream combines a subset of separated first video data streams, the predefined simultaneous video display template defining a format in which play each of the subset of separated first video data streams is organized to be displayed concurrently on a screen via the same stream of the respective mixed video data stream.

20. The non-transitory computer-readable storage medium of claim 11, wherein:
- each mixed audio data stream combines a subset of separated first audio data streams and allows a recipient to play the subset of separated first audio data streams collectively via the same stream of the respective mixed audio data stream; and
- video mixing is performed based on a predefined simultaneous video display template, and each mixed video data stream combines a subset of separated first video data streams, the predefined simultaneous video display template defining a format in which play each of the subset of separated first video data streams is organized to be displayed concurrently on a screen via the same stream of the respective mixed video data stream.

* * * * *